US009654251B1

(12) United States Patent
Niesen et al.

(10) Patent No.: US 9,654,251 B1
(45) Date of Patent: May 16, 2017

(54) JOINT CROSSTALK-AVOIDANCE AND ERROR-CORRECTION CODING FOR PARALLEL DATA BUSSES

(71) Applicant: QUALCOMM Incorporated, San Diego, CA (US)

(72) Inventors: Urs Niesen, Summit, NJ (US); Shrinivas Kudekar, Raritan, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 55 days.

(21) Appl. No.: 14/958,883

(22) Filed: Dec. 3, 2015

(51) Int. Cl.
*H03M 13/00* (2006.01)
*H04L 1/18* (2006.01)
*H04L 1/00* (2006.01)
*H04L 1/08* (2006.01)
*G06F 13/42* (2006.01)

(52) U.S. Cl.
CPC ........ *H04L 1/0041* (2013.01); *G06F 13/4208* (2013.01); *H04L 1/08* (2013.01)

(58) Field of Classification Search
CPC ...... H04L 1/0041; H04L 1/08; G06F 13/4208
See application file for complete search history.

(56) References Cited

U.S. PATENT DOCUMENTS

| | | | |
|---|---|---|---|
| 7,583,209 B1 * | 9/2009 | Duan | H03M 5/14 341/50 |
| 7,712,010 B2 | 5/2010 | Dell | |
| 8,964,879 B2 * | 2/2015 | Navid | H04L 1/0083 375/219 |
| 9,087,025 B2 | 7/2015 | Hollis | |

OTHER PUBLICATIONS

Fu B., "Crosstalk-Aware Multiple Error Control for Reliable On-Chip Interconnects," 2010, 214 pages.
Ganguly A., et al., "Design of Low Power & Reliable Networks on Chip Through Joint Crosstalk Avoidance and Multiple Error Correction Coding," Journal of Electronic Testing, 2008, vol. 24, pp. 67-81.
Singh H.P., et al., "Error Correction and Crosstalk Avoidance Techniques in On-Chip VLSI Interconnects," International Journal of Engineering Research & Technology (IJERT), Oct. 2012, vol. 1 (8), pp. 1-6.

\* cited by examiner

*Primary Examiner* — Sam Rizk
(74) *Attorney, Agent, or Firm* — Loza & Loza, LLP

(57) ABSTRACT

System, methods, and apparatus are described that facilitate transmission/reception of data over a multi-line parallel bus. In an example, the apparatus transmits data bits over a parallel bus includes determining from a prior bus state, a plurality of free wires in the bus for a current bus state, where each free wire satisfies a crosstalk-avoidance constraint in the current bus state for all values of a bit transmitted on the free wire. The apparatus may encode a plurality of data bits using a crosstalk avoidance encoder to obtain a CAC-encoded word, compute an error detection or correction code for the CAC-encoded word, assign bits of the error detection or correction code to the plurality of free wires for transmission during the current bus state, and assign the CAC-encoded word to unassigned wires of the bus for transmission during the current bus state.

30 Claims, 16 Drawing Sheets

JOINT CROSSTALK-AVOIDANCE AND ERROR-CORRECTION CODING FOR PARALLEL DATA BUSSES

BACKGROUND

Field

The present disclosure relates generally to high-speed data communications, and more particularly, to encoding and decoding data over a multi-line parallel bus.

Background

High-speed interfaces are frequently used between circuits and components of mobile wireless devices and other complex apparatus. For example, certain devices may include processing, communications, storage and/or display devices that interact with one another through communications links. Some of these devices, including synchronous dynamic random access memory (SDRAM), may be capable of providing or consuming data and control information at processor clock rates. Other devices, such as display controllers, may require variable amounts of data at relatively low video refresh rates.

In a system-on-chip (SoC), various components are integrated on a single die. For example, a typical SoC in present mobile phones contains hundreds of components such as central and graphical processing units, memories, power management circuits, cellular and other wireless radios, etc. This integration of a large number of components onto a single silicon substrate results in smaller and lower-power processing units compared to traditional systems. All of these components communicate with each other via metal wires known as interconnects or busses.

Components may intercommunicate using interconnects or busses in systems other than SoC systems. For example, a central processing unit (CPU) or other processor may communicate with a memory device via an interconnect located on a printed circuit board (PCB).

Problems associated with these interconnects are transmission energy and delay. For a given technology, the width of the wire and the distance to the substrate remains fixed, and hence the capacitive coupling depends strongly on the distance between the wires. As the inter-wire spacing decreases, the coupling capacitance between adjacent wires increases, leading to increased crosstalk. This crosstalk between adjacent wires degrades the signal integrity and increases transmission energy and delay. Hence, the interconnects pose a challenge to keep up with the demand for increasing data transfer rates. What is needed is an improved crosstalk avoidance scheme that improves signal integrity while decreasing transmission energy and delay.

SUMMARY

Embodiments disclosed herein provide systems, methods and apparatus for transmitting/receiving data bits over a multi-line parallel bus with improved signal integrity. Encoders and decoders are disclosed that provide joint crosstalk avoidance and error correction and/or detection.

In an aspect of the disclosure, a method of transmitting data bits over a parallel bus includes determining from a prior bus state, a plurality of free wires in the bus for a current bus state, where each free wire satisfies a crosstalk-avoidance constraint in the current bus state for all values of a bit transmitted on the free wire. The method may also include encoding a plurality of data bits using a crosstalk avoidance encoder to obtain a crosstalk-avoidance coding (CAC) encoded word, computing an error detection or correction code for the CAC-encoded word, assigning bits of the error detection or correction code to the plurality of free wires for transmission during the current bus state, and assigning the CAC-encoded word to two wires of the bus that are not used for carrying bits of the error detection or correction code.

In an aspect of the disclosure, an apparatus includes a storage device configured to maintain an indication of a past state of a multi-wire parallel bus, and a crosstalk avoidance encoder adapted to determine a plurality of free wires in the bus for a current state of the multi-wire parallel bus based on the past state of the multi-wire parallel bus, where each free wire satisfies a crosstalk-avoidance constraint in the current state of the multi-wire parallel bus for all values of a bit transmitted on the free wire. The apparatus may provide a crosstalk avoidance encoded word by encoding a plurality of data bits. The apparatus may include an error-correction coding encoder configured to compute an error detection or correction code for the crosstalk avoidance encoded word, and a selector circuit configured to assign bits of the error detection or correction code to the plurality of free wires for transmission as part of the current state of the multi-wire parallel bus, and assign the crosstalk avoidance encoded word to wires of the bus that are not used for carrying bits of the error detection or correction code.

In an aspect of the disclosure, an apparatus includes means for determining from a prior bus state, a plurality of free wires in the bus for a current bus state, where each free wire satisfies a crosstalk-avoidance constraint in the current bus state for all values of a bit transmitted on the free wire. The apparatus may also include means for encoding a plurality of data bits using a crosstalk avoidance encoder to obtain a CAC encoded word, means for computing an error detection or correction code for the CAC-encoded word, means for assigning bits of the error detection or correction code to the plurality of free wires for transmission during the current bus state, and means for assigning the CAC-encoded word to two wires of the bus that are not used for carrying bits of the error detection or correction code.

In an aspect of the disclosure, a processor readable storage medium may have code stored thereon. The code may include instructions for determining from a prior bus state, a plurality of free wires in the bus for a current bus state, where each free wire satisfies a crosstalk-avoidance constraint in the current bus state for all values of a bit transmitted on the free wire. The code may include instructions for encoding a plurality of data bits using a crosstalk avoidance encoder to obtain a CAC encoded word, computing an error detection or correction code for the CAC-encoded word, assigning bits of the error detection or correction code to the plurality of free wires for transmission during the current bus state, and assigning the CAC-encoded word to two wires of the bus that are not used for carrying bits of the error detection or correction code.

In an aspect of the disclosure, a method of receiving data bits from a parallel bus includes determining from a prior bus state, a plurality of free wires in the bus for a current bus state, where each free wire satisfies a crosstalk-avoidance constraint in the current bus state for all values of a bit transmitted on the free wire. The method may also include receiving an error detection or correction code from the plurality of free wires, jointly operating a crosstalk avoidance decoder and an error detection or correction decoder to decode the current bus state, and providing a plurality of data bits decoded from the current bus state.

In an aspect of the disclosure, an apparatus includes a processing circuit, a storage device configured to maintain a past bus state of a multi-wire parallel bus, and a crosstalk avoidance decoder that jointly operated with an error detection or correction decoder. The processing circuit and/or crosstalk avoidance decoder may be configured to determine from the prior bus state, a plurality of free wires in the bus for a current bus state, where each free wire satisfies a crosstalk-avoidance constraint in the current bus state for all values of a bit transmitted on the free wire. An error detection or correction code provided by the error detection or correction decoder may be used to correctly decode the current bus state.

In an aspect of the disclosure, an apparatus includes means for determining from a prior bus state, a plurality of free wires in the bus for a current bus state, where each free wire satisfies a crosstalk-avoidance constraint in the current bus state for all values of a bit transmitted on the free wire. The apparatus may also include means for receiving an error detection or correction code from the plurality of free wires, means for jointly operating a crosstalk avoidance decoder and an error detection or correction decoder to decode the current bus state, and means for providing a plurality of data bits decoded from the current bus state.

In an aspect of the disclosure, a processor readable storage medium may have code stored thereon. The code may include instructions for determining from a prior bus state, a plurality of free wires in the bus for a current bus state, where each free wire satisfies a crosstalk-avoidance constraint in the current bus state for all values of a bit transmitted on the free wire. The method may also include receiving an error detection or correction code from the plurality of free wires, jointly operating a crosstalk avoidance decoder and an error detection or correction decoder to decode the current bus state, and providing a plurality of data bits decoded from the current bus state.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Overview

Certain disclosed examples relate to systems and apparatus for transmitting/receiving data bits over a number of conductors in a parallel bus. The conductors may include three or more conductors, and each conductor may be referred to as a wire, a connector, and/or interconnect. The conductors may include conductive traces disposed on a circuit board or within a conductive layer of a semiconductor integrated circuit (IC) device. The connectors may be configured or arranged to provide one or more busses. In one example, the conductors may be divided into a plurality of transmission groups, each group encoding a portion of a block of data to be transmitted.

Figure 1:
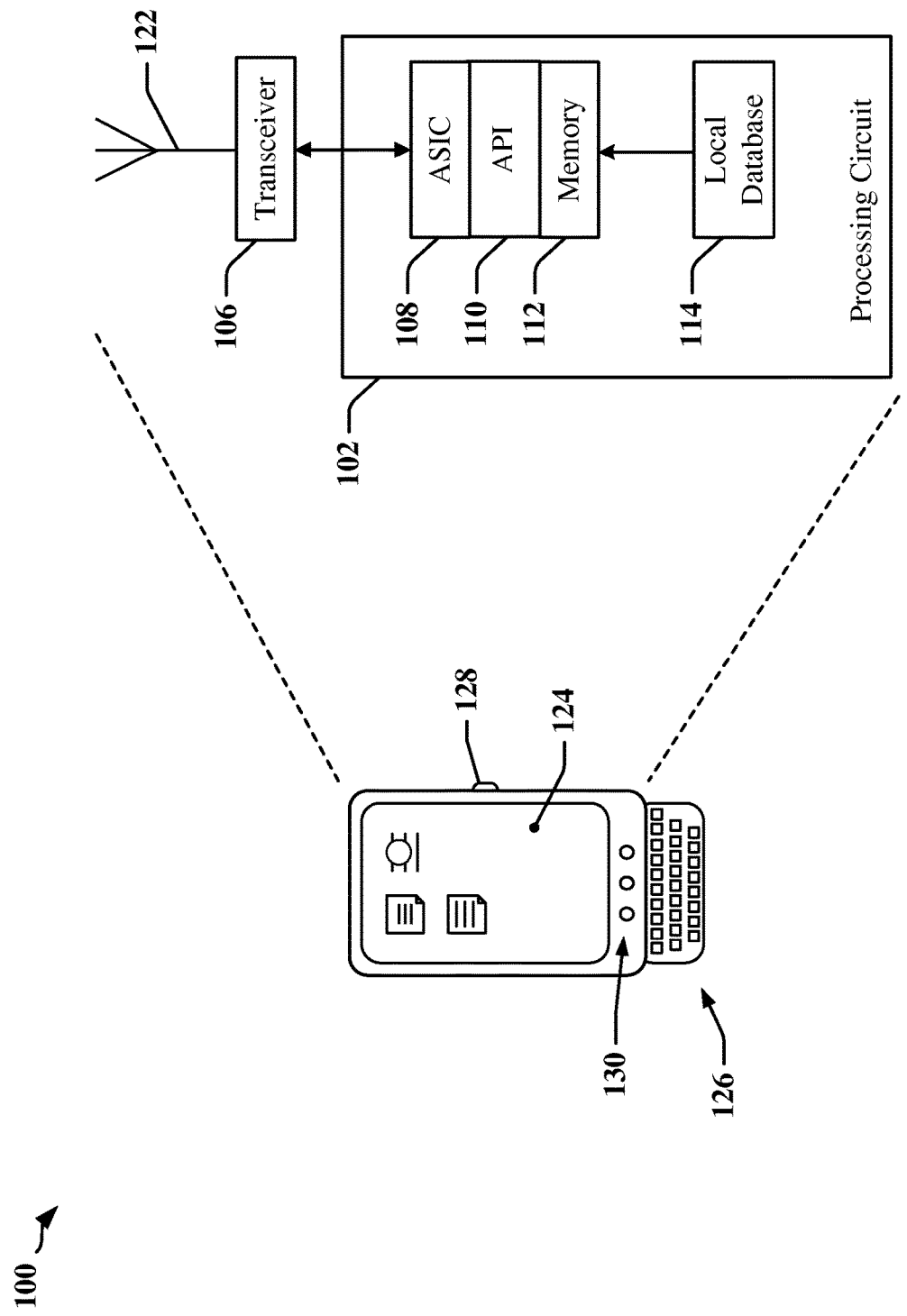
FIG. 1 depicts an apparatus that employs an encoded data link between devices within the apparatus.

Certain aspects of the disclosure may be applicable to communications links deployed between electronic components, which may include subcomponents of devices such as telephones, mobile computing devices, appliances, automobile electronics, avionics systems, etc. Referring to FIG. 1, for example, an apparatus 100 employing one or more busses for intercommunication between constituent devices may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, which may include an application specific integrated circuit (ASIC) 108. The ASIC 108 may include one or more processing devices, logic circuits, and so on. The processing circuit 102 may include and/or be coupled to processor readable storage 112 that may maintain instructions and data that may be executed by the processing circuit 102. The processing circuit 102 may be controlled by one or more of an operating system and an application programming interface (API) 110 layer that supports and enables execution of software modules residing in the storage 112 of the wireless device. The storage 112 may include read only memory (ROM) or random access memory (RAM), electrically erasable programmable read only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
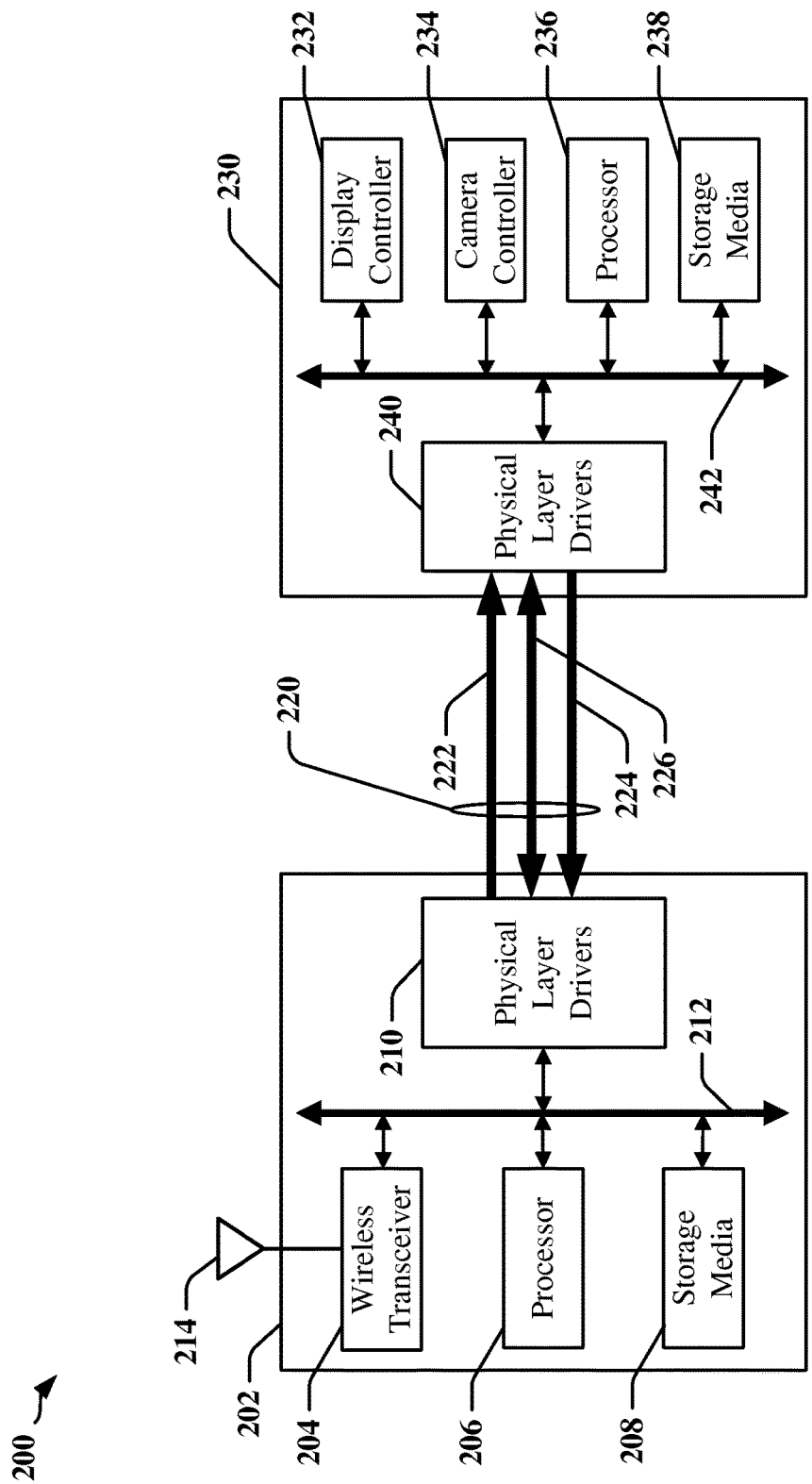
FIG. 2 illustrates certain aspects of an apparatus that may be adapted in accordance with certain aspects disclosed herein.

FIG. 2 is a block schematic illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may be provided as an SoC, and/or may include a plurality of devices 202 and 230, including IC devices that exchange data and control information through a communications link 220. The communications link 220 may be used to connect the devices 202 and 230, which may be located in close proximity to one another or physically located in different parts of the apparatus 200. In one example, the communications link 220 may be provided on a chip carrier, substrate or circuit board that carries the devices 202 and 230. In another example, a first device 202 may be located in a keypad section of a flip-phone while a second device 230 may be located in a display section of the flip-phone. A portion of the communications link 220 may include a cable or an optical connection.

The communications link 220 may include multiple channels 222, 224 and 226. One or more communications channel 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a forward communications channel 222 may be referred to as a forward link while a reverse communications channel 224 may be referred to as a reverse link. The first device 202 may be designated as a host, master and/or transmitter, while the second device 230 may be designated as a client, slave and/or receiver, even if both devices 202 and 230 are configured to transmit and receive on the communications link 220. In one example, the forward channel 222 may operate at a higher data rate when communicating data from a first device 202 to a second device 230, while the reverse channel 224 may operate at a lower data rate when communicating data from the second device 230 to the first device 202.

The devices 202 and 230 may each include a processing circuit 206, 236 or other computing circuit, processor and/or device. In one example, the first device 202 may perform core functions of the apparatus 200, including maintaining wireless communications through a wireless transceiver 204 and an antenna 214, while the second device 230 may support a user interface that manages or operates a display controller 232, and may control operations of a camera or video input device using a camera controller 234. Other features supported by one or more of the devices 202 and 230 may include a keyboard, a voice-recognition component, and other input or output devices. The display controller 232 may include circuits and software drivers that support a display such as a liquid crystal display (LCD) panel, a touch-screen display, an indicator, and so on. The storage media 208 and 238 may include transitory and/or non-transitory storage devices adapted to maintain instructions and data used by the respective processing circuits 206 and 236, and/or other components of the devices 202 and 230. Communication between each processing circuit 206, 236 and its corresponding storage media 208 and 238 and other modules and circuits may be facilitated by one or more busses 212 and 242, respectively.

The reverse channel 224 may be operated in the same manner as the forward channel 222. The forward channel 222 and the reverse channel 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a bidirectional communications channel 226 may support communications between the first device 202 and the second device 230. The forward channel 222 and/or the reverse channel 224 may be configurable to operate in a bidirectional mode when, for example, the forward and reverse channel 222 and 224 share the same physical connections and operate in a half-duplex manner.

In certain examples, the reverse channel 224 derives a clocking signal from the forward channel 222 for synchronization purposes, for control purposes, to facilitate power management and/or for simplicity of design. The clocking signal may have a frequency that is obtained by dividing the frequency of a symbol clock used to transmit signals on the forward channel 222. The symbol clock may be superimposed or otherwise encoded in symbols transmitted on the forward channel 222. The use of a clocking signal that is a derivative of the symbol clock allows fast synchronization of transmitters and receivers (transceivers 210, 240) and enables fast start and stop of data signals without the need for framing to enable training and synchronization.

In certain examples, a bidirectional channel 226 may support communications between the first device 202 and the second device 230. In some instances, the first device 202 and the second device 230 provide encoding and decoding of data, address and control signals transmitted between a processing device and memory devices such as dynamic random access memory (DRAM) devices.

Figure 3:
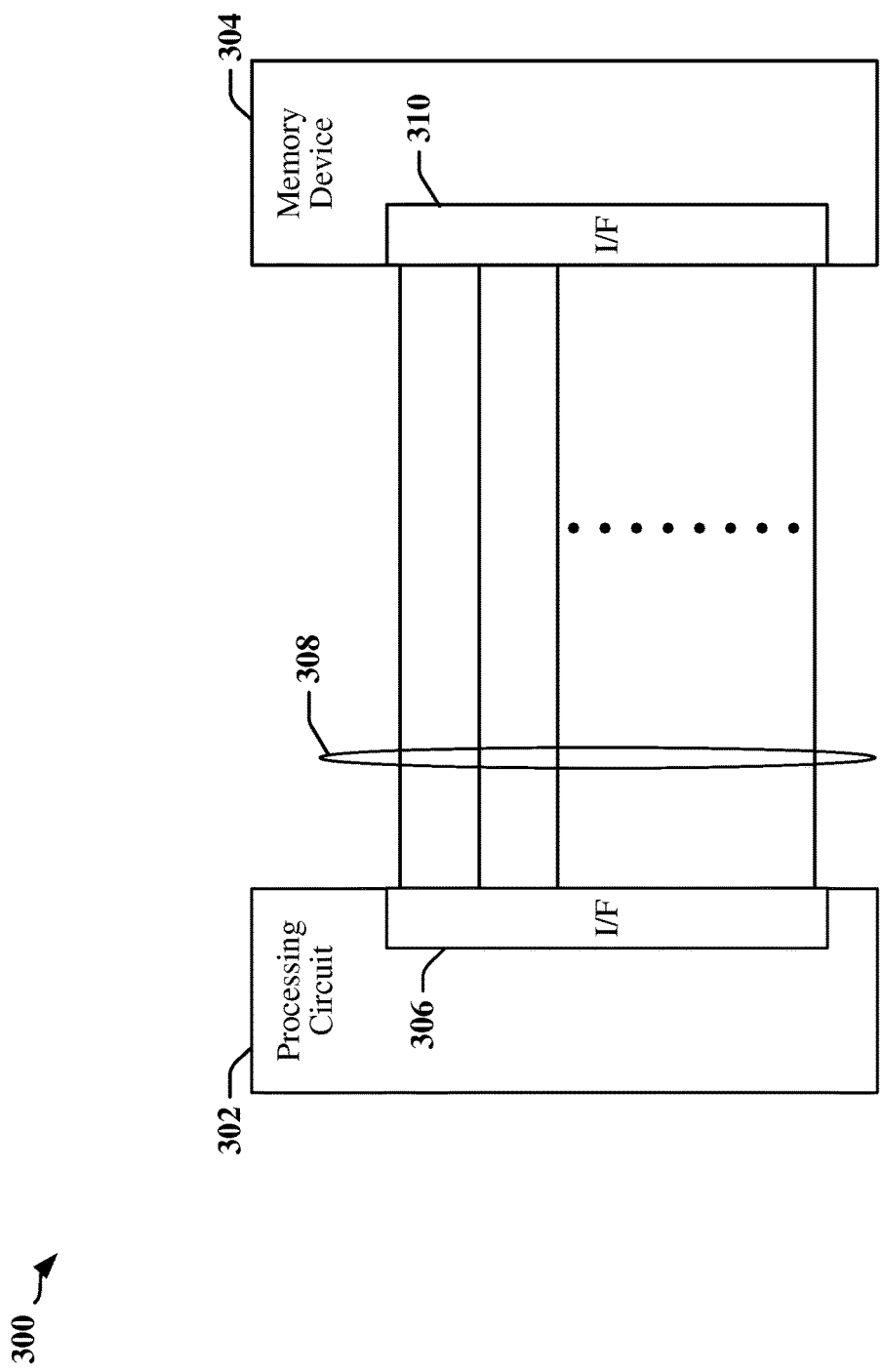
FIG. 3 is illustrates a memory interface that may be adapted in accordance with certain aspects disclosed herein.

FIG. 3 is a block diagram illustrating an example of an apparatus 300 in which a processing circuit 302 may be configured to read and write data to a memory device 304 using high-speed interface circuits 306, 310. One interface circuit 306 may be implemented as a controller that is embedded in or cooperates with the processing circuit 302. Another interface circuit 310 may be implemented as a controller that is embedded in or cooperates with the memory device 304.

In one example, the processing circuit 302 and the memory device 304 may be components of the apparatus 100 depicted in FIG. 1. The processing circuit 302 and the memory device 304 may be coupled using a bus 308 that includes a number of connectors, wires, electrically conductive traces on a circuit board or chip carrier, package substrate, silicon (or alternative material) interposer, electrically conductive traces in a metallization layer of an IC, and/or other electrical connectors and devices. The bus 308 may include some combination of unidirectional and bidirectional connectors.

The bus 308 may be configured to carry one or more differential signals in corresponding pairs of connectors. For example, data may be transmitted over single-ended channels, while certain control signals may be transmitted using differential channels. Some memory devices may employ a write clock (WCK), while other memory devices may use a data strobe signal (DQS signal) to determine when data is valid and/or can be reliably captured from data signals (DQ signals) on the bus 308.

Error Correction and Crosstalk Avoidance

Figure 4:
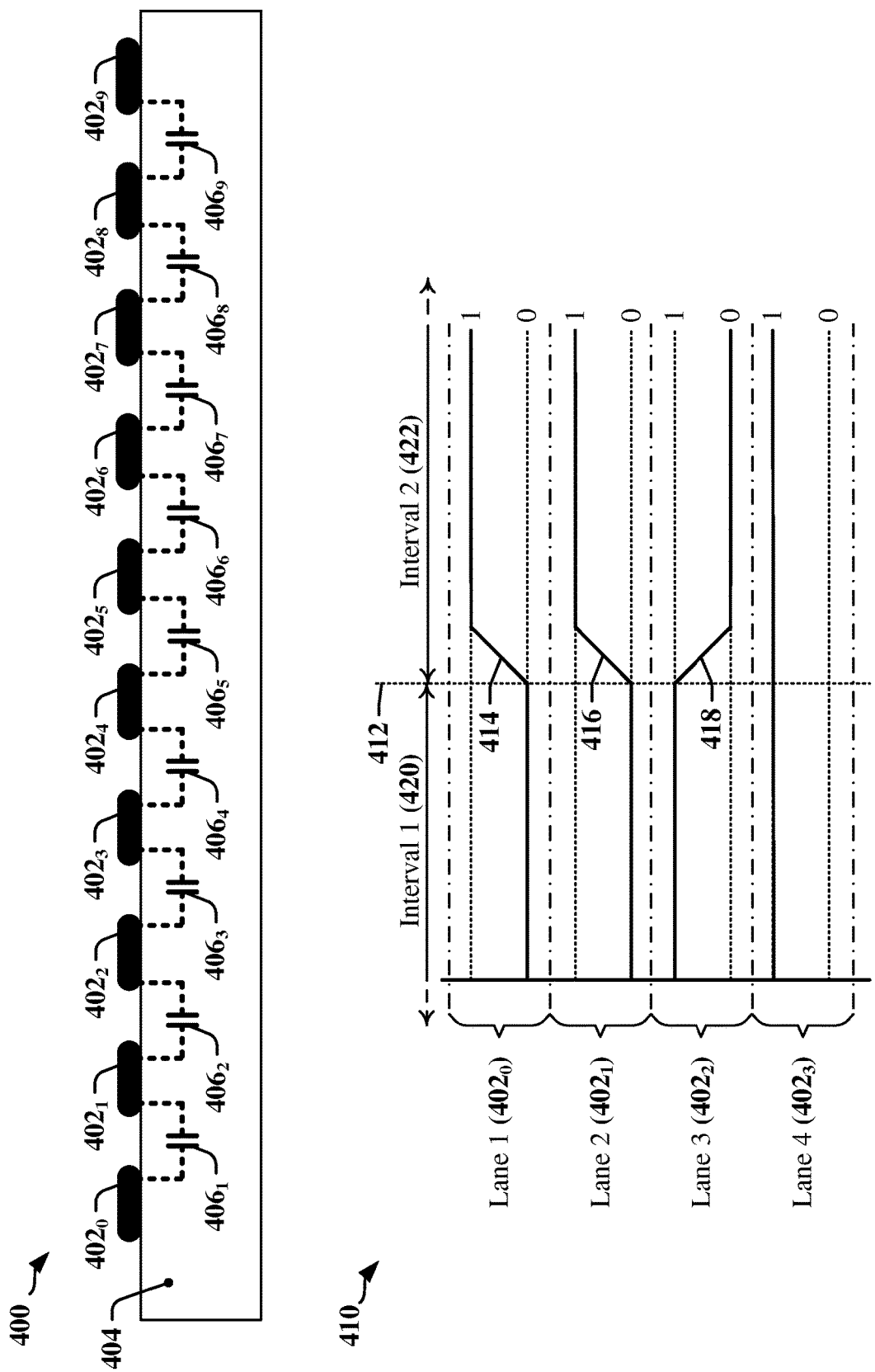
FIG. 4 illustrates a physical layout of a portion of a bus hat may be operated in accordance with certain aspects disclosed herein.

Due to decreasing transistor sizes, interconnect wires, which may be organized as a bus for example, are emerging as a performance bottleneck in SoCs and for chip-to-chip communications. With reference to FIG. 4, bus transmission energy and delay may be affected by capacitive coupling (illustrated as capacitances $406_1$-$406_9$) between neighboring wires (which may be referred to as lanes $402_0$-$402_9$ of a bus 400). Transmission energy and delay are adversely affected by increases in bus interline capacitive coupling driven by technology scaling. If the ratio of the bus interline capacitance to the bulk capacitance (sum of parasitic, driver, and load capacitances to ground) is $\lambda$, then worst-case transmission energy and delay for an N-wire bus is proportional to $1+4\lambda$. Decreased inter-wire spacing and increased clock frequencies used in SoCs, ASICs and other IC devices can produce increased crosstalk between adjacent wires can degrade signal integrity and increase transmission energy and delay, resulting in increased transmission errors.

FIG. 4 illustrates an example of physical layout of a portion of a bus 400 that includes 10 lanes $402_0$-$402_9$ that are deployed in substantial parallel alignment on a substrate 404. The lanes $402_0$-$402_9$ may correspond to one of multiple groups of lanes in the bus 400. Each of the lanes $402_0$-$402_9$ may be implemented using a wire, a trace on a circuit board or chip-carrier, an interconnect within an IC device, and/or another of electrical connector. The lanes $402_0$-$402_9$ may be physically arranged in parallel for some or all segments of the bus 400, and the distances separating adjacent lanes $402_0$-$402_9$ may be variable. Crosstalk may result due to capacitive coupling between two or more of the lanes $402_0$-$402_9$. As illustrated, each pair of the lanes $402_0$-$402_9$ may be coupled by an interline capacitance $406_1$-$406_9$. The magnitude of the crosstalk between a pair of adjacent lanes $402_0$-$402_9$ may be calculable based on the value of the interline capacitance $406_1$-$406_9$ between the pair of adjacent lanes $402_0$-$402_9$, and the nature of transitions in signaling state on each lane of the pair of adjacent lanes $402_0$-$402_9$.

Transitions at a boundary 412 between signaling states corresponding to consecutively transmitted words are illustrated in the timing diagram 410 of FIG. 4. Words may be transmitted in transmission intervals 420, 422 defined by a transmit clock or receive clock. The bus state during a transmission interval 420, 422 may be the combination of the signaling states of each lane $402_0$-$402_9$. Transitions in signaling state may occur on one or more of the lanes $402_0$-$402_9$ at the boundary 412 between transmission intervals 420, 422. In the illustrated example, positive transitions 414, 416 occur on a first lane $402_0$ and a second lane $402_1$, a negative transition 418 occurs on a third lane $402_2$, while no transition occurs on a fourth lane $402_3$. In this example, signals transition between two signaling states, although the principles disclosed herein may be applied to signals that transition between three or more signaling states.

Various solutions for improving communication reliability have been implemented. Some of these solutions, such as crosstalk-avoidance coding (CAC) schemes, attempt to prevent or minimize transmission errors on a parallel bus 400 subject to capacitive coupling of adjacent connectors. Crosstalk levels affecting one of the lanes $402_0$-$402_9$ may depend on the types of transition that occur on adjacent or neighboring lanes $402_0$-$402_9$ at or near the boundary 412 between transmission intervals 420, 422, and may correspond to the types of transitions that occur on the various lanes $402_0$-$402_9$. For example, maximum crosstalk may be observed when opposite bit (i.e., opposite direction) transitions 416, 418 occur on a first pair of adjacent lanes $402_1$, $402_2$. Decreased crosstalk may be observed when the same type of transition 414, 416 occurs on a second pair of adjacent lanes $402_0$, $402_1$. In the case of a third pair of adjacent lanes $402_2$, $402_3$, intermediate levels of crosstalk may occur when the signaling state of one lane $402_3$ does not change.

CAC may be used to encode data to be transmitted on a parallel bus 400 subject to capacitive coupling between adjacent lanes such that opposing bit transitions 416, 418 on adjacent lanes $402_1$, $402_2$ may be avoided. CAC involves encoding data in words for transmission on the parallel bus 400 where certain transition patterns are avoided. CAC can reduce energy consumption and propagation delay by avoiding the occurrence of opposing bit transitions on adjacent wires of the bus 400. CAC may reduce worst-case transmission energy and delay by encoding data in a manner that prevents certain transitions on adjacent wires. CAC may use interface circuits 306, 310 to encode data for transmission by encoding data such that occurrences of opposing bit transitions on adjacent lanes $402_1$, $402_2$ (for example) are avoided. According to certain aspects disclosed herein, data transmitted on the bus 400 may be encoded based on data previously transmitted over the bus 400 (hereinafter referred to as past bus state) to obtain a current bus state while avoiding certain transitions. In FIG. 4, the past bus state may correspond to the combination of the signaling states of each lane $402_0$-$402_9$ during a first transmission interval 420, and the current bus state may correspond to the combination of the signaling states of each lane $402_0$-$402_9$ during a second, subsequent transmission interval 422.

Other solutions for improving communication reliability provide techniques for detecting transmission errors on a bus 400 and, in some instances, enable a receiver to reverse the effects of one or more transmission errors. Error-correction coding (ECC) schemes, provide encoding redundancy through the addition of parity bits in order to detect and correct errors that may occur during transmission. ECC schemes increase the number of wires needed in the bus 400. In the example of the double-data rate fourth generation (DDR4) SDRAM standard, an 8-bit cyclic-redundancy code (CRC) is used to provide error correction for 72 bits of data in a total of 80 lanes. ECC is a technique for encoding data that provides redundancy through the addition of parity bits. This redundancy can be used to detect and correct errors occurring during transmission.

It may be desirable to use some combination of CAC and ECC in certain applications. Issues may arise when CAC and ECC are combined. In one example, when a combination of an ECC inner code followed by a CAC outer code is used, the CAC outer code cannot be reliably decoded in the presence of errors. In another example, when a combination of a CAC inner code followed by an ECC outer code is used, the ECC outer code can counteract the crosstalk-avoidance provided by the CAC.

Previous approaches to combining CAC and ECC have involved tradeoffs between reliability and efficiency of the bus. These previous approaches encode information using a CAC and use ECC to generate parity bits from the output of the CAC encoder. Each parity bit is then transmitted using two wires to avoid crosstalk. The approach is inefficient because of this use of two wires per parity bit. In the example of DDR4 DRAM, if the 72 bits are already CAC encoded, then the ECC would generate an additional 16 bits, resulting in a total of 88 lanes.

Efficiently Combining CAC and ECC

According to certain aspects of the invention, information may be reliably and efficiently transmitted over a parallel bus using the joint CAC and ECC encoding techniques disclosed herein. In one example, interface circuits 306, 310 (see FIG. 3) may be adapted to perform joint CAC and ECC encoding for a 72-bit DDR4 DRAM bus using 10 bit lanes to transmit ECC bits in a manner that satisfies crosstalk-avoidance constraints. Joint encoding for CAC and ECC according to certain aspects uses fewer bus lanes than state-of-the-art solutions and can provide better protection against transmission errors.

Crosstalk-avoidance constraints may be defined and used to prevent patterns of transitions in bus state that produce high levels of crosstalk. In one example, a CAC encoder may be constrained from producing a bus state in which opposite-direction transitions 416, 418 occur on two adjacent lanes $402_1$, $402_2$ (see FIG. 4). The crosstalk-avoidance constraint may be applied in three dimensions, where the adjacent lanes are defined in both horizontal and vertical planes. In some instances, a crosstalk-avoidance constraint in the horizontal dimension may specify a first number of lanes required to separate opposite-direction transitions 416, 418 in the horizontal plane and a second number of lanes required to separate opposite-direction transitions 416, 418 in the vertical plane. The first and second numbers of separating lanes may be different or the same crosstalk-avoidance constraint can be tailored for busses that use signaling schemes in which three or more voltage or current states are defined.

According to certain aspects, ECC bits calculated for CAC-encoded information may be transmitted on free wires. A free wire may be defined as one of the lanes $402_0$-$402_9$ that can satisfy crosstalk-avoidance constraints regardless of any possible transition that may occur at the next change in bus state.

Figure 5:
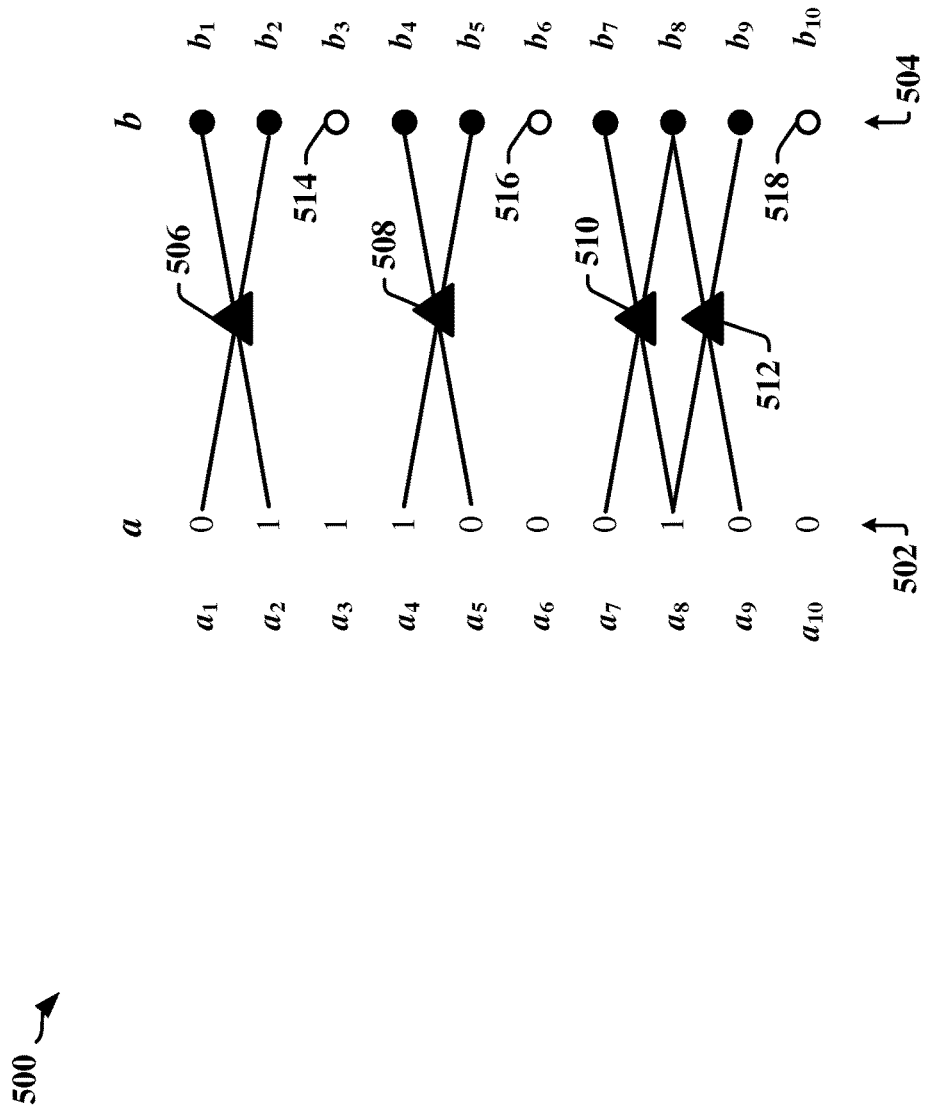
FIG. 5 illustrates the occurrence of free wires that may be used by encoders adapted according to certain aspects disclosed herein.

FIG. 5 is a factor graph 500 illustrating the occurrence of free wires that may be used by encoders adapted according to certain aspects disclosed herein. In these encoders, a past bus state 502 may be described by the sequence of bits $a_1$, $a_2$, . . . , $a_N$ for an N-wire bus. Data to be transmitted over the bus may be encoded sequentially into a new bus state denoted as $b_1$, $b_2$, . . . . $b_N$, which may be referred to as the next bus state 504. Data may be encoded sequentially commencing with a first lane $402_0$ of the bus, continuing with the second lane $402_2$, and so on, until the Nth lane. Each lane $402_0$-$402_N$ may include a wire, trace, connector, or the like. Encoding the new bus state is based on the past bus state.

In the general case, where the bus has N lanes and the past bus state 502 is denoted as a=($a_1$, $a_2$, . . . , $a_N$). An encoder maybe adapted or configured to determine a next bus state 504, denoted as b=($b_1$, $b_2$, . . . , $b_N$). According to certain aspects, the free bus wires 514, 516, 518 for the past bus state 502 are identified. Each wire in the past bus state 502 that is the middle wire of three wires that have the same signaling state for the past bus state 502 can be set to '0' or '1' without violating crosstalk constraints. That is, for an nth wire, where $a_{n-1}$, $a_n$, $a_{n+1}$ in the past bus state 502 have the same value, the encoder can set the next value ($b_n$) to any desired signaling state without violating the crosstalk constraints and without affecting the values of $b_{n-1}$, $b_{n+1}$ that can be sent over adjacent wires.

In the factor graph 500, triangles 506, 508, 510, and 512 located between the past bus state 502 (a), and the next bus state 504 (b) represent the crosstalk constraints imposed by the past bus state 502. In one example, a first triangle 506 is provided because $a_1$=0, $a_2$=1 requires that ($b_1$, $b_2$)≠(1, 0), since otherwise an opposing transition would occur on the on these two adjacent wires. In another example, a second triangle 508 is provided because $a_4$=1, $a_5$=0 requires that ($b_4$, $b_5$)≠(0, 1), since otherwise an opposing transition would occur on the on these two adjacent wires.

Free wires are identified when their values for the next bus state 504 are not connected to any constraint. For example, the wires $b_3$, $b_6$, $b_{10}$ do not have any associated constraints and are indicated by the white circles 514, 516, 518. The wires $b_3$, $b_6$, $b_{10}$ are free wires that can be set to any value in the next bus state 504 without affecting wires adjacent to them and without violating any crosstalk constraints. These free wires may be used to carry ECC bits that are calculated concurrently with, or after CAC encoding in a joint CAC/ECC encoder.

Examples of Joint CAC/ECC Encoders

Figure 6:
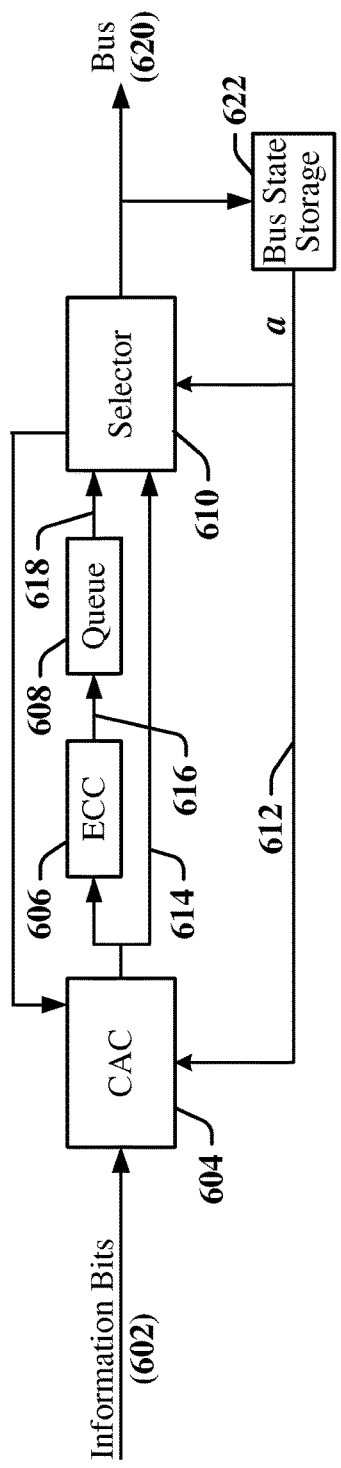
FIG. 6 illustrates examples of encoders adapted according to certain aspects disclosed herein.
Figure 6:
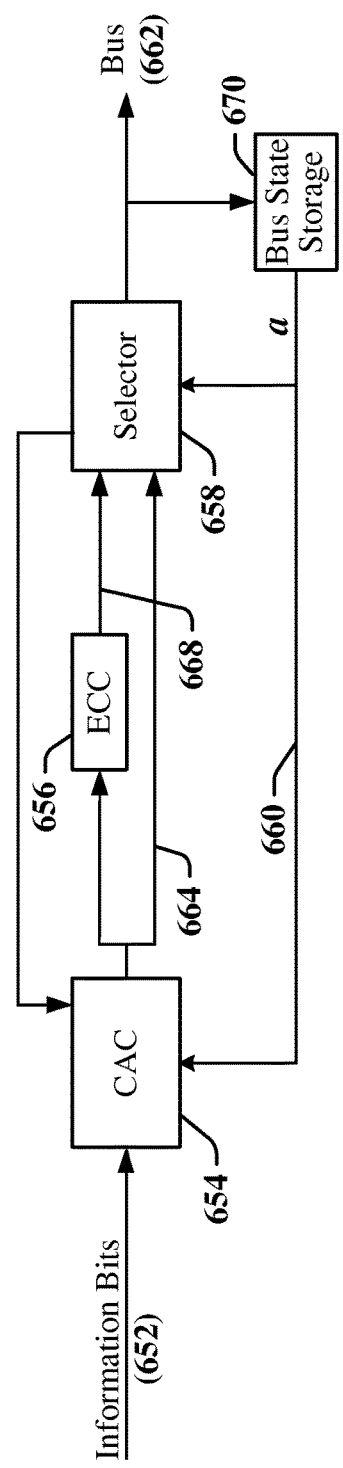

A variety of encoding techniques may be adapted to support joint CAC and ECC encoding. For example, FIG. 6 illustrates two encoders 600, 650 that can be configured to use free wires to carry ECC bits.

In one example, an encoder 600 may adapt a convolution error-correction code to provide joint CAC and ECC encoding. A sequential CAC encoder 604 may consider past bus state 612 when encoding information bits 602 to produce an encoded word 614. The encoder 600 may include storage 622 that maintains the past bus state 612. The storage 622 may be provided using registers or other types of memory device, and the storage 622 may maintain a history of prior bus states. A convolutional ECC encoder 606 generates parity bits 616 for the encoded word 614 received from the CAC encoder 604. The convolutional ECC encoder 606 may periodically generate new parity bits 616 that are buffered in a bounded queue 608. A selector circuit 610 receives queued parity bits 618 and determines which bit should be sent over the bus 620. The selector circuit 610 may assign parity bits 618 obtained from the queue 608 to wires of the bus 620. In one example, the selector circuit 610 fills the bus 620 sequentially, starting from a first wire (e.g. a wire corresponding to the first lane $402_0$). While sequentially filling the bus 620, the selector circuit 610 may encounter a first free wire based on the past bus state 612. A first parity bit in the queue, which may be an oldest parity bit waiting in the queue 608, may be assigned to the first free wire. If no parity bit is available in the queue, the selector circuit 610 may request a new bit from the CAC encoder 604 for assignment to the current wire. In the example illustrated in FIG. 4, the lanes $402_0$-$402_N$ of the bus 400 may be sequentially assigned CAC-encoded bits or ECC bits from the leftmost lane $402_0$ to the rightmost lane $402_9$, or from the rightmost lane $402_9$ to the leftmost lane $402_0$. In other configurations, a sequence of lanes may include lanes that are ordered such that each lane in the sequence is physically adjacent to predecessor and successor lanes in the sequence.

In some instances, the queue 608 may be empty or full. When the queue is empty, the selector circuit 610 may continue to poll the queue 608 while assigning bits received from the CAC encoder 604 until the queue is no longer empty, even when the selector circuit 610 encounters a free wire. When the queue 608 is full, the selector circuit 610 may force one or more non-free wires to carry parity bits. In one example, the selector circuit 610 may respect crosstalk-avoidance constraints by using the next two consecutive wires to carry one parity bit. For example, the selector circuit 610 may resend the same bit transmitted in the past bus state on the first of two consecutive lanes and send a parity bit on the second of two consecutive lanes. Crosstalk constraints are met because the first of the two consecutive lanes has no transition between the past bus state and the current bus state.

In another example, an encoder 650 may use block error-correction coding to provide joint CAC and ECC encoding. In this example, the CAC encoder 654 may consider past bus state 660 when encoding information bits 652 to produce an encoded word 664, which may be assigned by the selector circuit 658 to non-free wires of the bus 662. The encoder 650 may include storage 670 that maintains the past bus state 660. The storage 670 may be provided using registers or other types of memory device, and the storage 670 may maintain a history of prior bus states. The ECC encoder 656 may then compute parity bits 668 for the data (encoded word 664) assigned to the non-free wires. The parity bits 668 may then be assigned by the selector circuit 658 to the free wires of the bus 662.

In some instances, the number of free wires may exceed the number of parity bits 668, and the selector circuit 658 may use some free wires to carry the encoded word 664 provided by the CAC encoder 654. In some instances, the number of free wires may be less than the number of parity bits, and the selector circuit 658 may force one or more non-free wires to carry certain of the parity bits 668. In one example, the selector circuit 610 may respect crosstalk-avoidance constraints by using two adjacent wires to carry one parity bit. For example, the selector circuit 658 may resend the same bit transmitted in the past bus state on the first of two adjacent wires and send a parity bit on the second of two adjacent wires. Crosstalk constraints are met because the first of the two adjacent wires has no transition between the past bus state and the current bus state.

In operation, an encoder 600, 650 may use the storage 622, 672 to maintain an indication of a past bus state 612, 660. The storage 622, 672 may include one or more registers that are clocked using a transmit clock associated with the bus 620, 662 such that the transmitted state is captured for use in encoding data in a succeeding bus state. The CAC encoder 604, 654 may be adapted to receive the past bus state 612, 660 and determine a plurality of free wires for a current or next bus state. Each free wire may satisfy a crosstalk-avoidance constraint in the current state of the bus 620, 662 for all potential values of a bit transmitted on the free wire. The CAC encoder 604, 654 may provide a crosstalk avoidance encoded word 614, 664 by encoding data received by the CAC encoder 604, 654 as a plurality of information bits 602, 652. The ECC encoder 606, 656 may be configured to compute an error detection or correction code 616, 668 for the crosstalk avoidance encoded word 614, 664. The selector circuit 610, 658 may be configured to assign bits of the error detection or correction code 616, 668 to the plurality of free wires for transmission as part of the current bus state, and assign the crosstalk avoidance encoded word 614, 664 to wires of the bus 620, 662 that are not used for carrying bits of the error detection or correction code 616, 668.

In some examples, a free wire satisfies a crosstalk-avoidance constraint in the current bus state when the free wire and each directly adjacent wire are in a same signaling state in the past state of the multi-wire parallel bus. In some instances, parallel wires may be aligned in any plane in three-dimensional space. For example, a first wire may be adjacent to, and aligned with a second wire in a horizontal plane and the first wire may be adjacent to, and aligned with a third wire in a vertical plane. The crosstalk avoidance encoder is configured to avoid producing opposite direction transitions on pairs of neighboring wires.

In some instances, the ECC encoder 656 operates as a block error-correction encoder. In other instances, the ECC encoder 606 operates as a convolutional encoder. In one example, the ECC encoder 606 produces a cyclic-redundancy code. When operating as a convolutional encoder, the ECC encoder 606 may receive bits of the ECC code 616 sequentially from the queue 608. The queue may be implemented as a ring buffer, a first-in first-out (FIFO) register or using some other suitable queuing device or structure. When the ECC encoder 606 operates as a convolutional encoder, the selector circuit 610 may be configured to assign each bit 618 obtained from the queue 608 to a free wire encountered in a sequence of wires when a bit of the error detection or correction code is available in the queue 608, while assigning a bit of the crosstalk avoidance encoded word 614 to the free wire when no bits of the error detection or correction code 616 are available in the queue 608. The selector circuit 610 may assign a bit obtained from the queue 608 to a pair of adjacent wires in the sequence of wires when the queue 608 is full.

Examples of the Operation of Joint CAC/ECC Encoders

Figure 7:
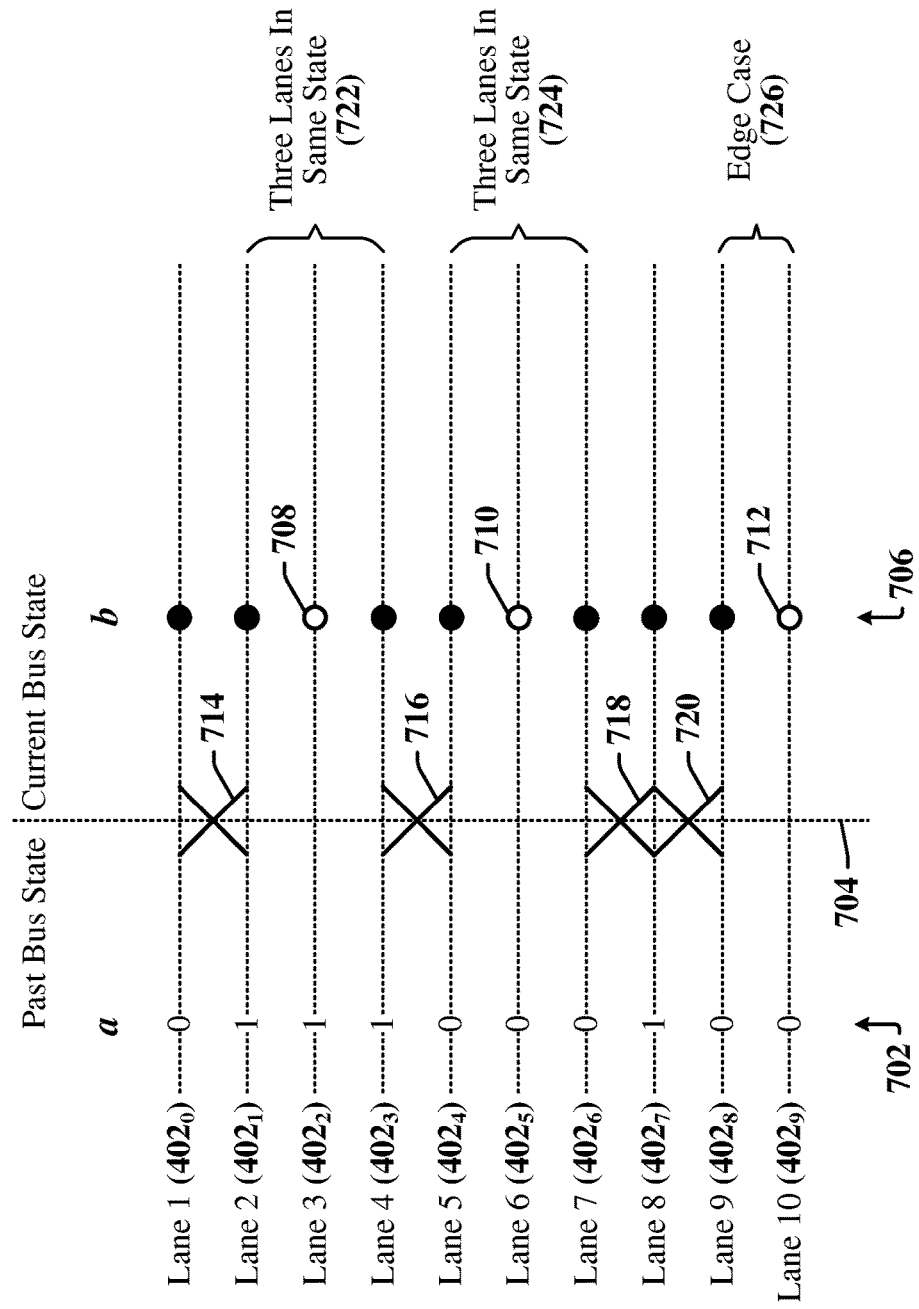
FIG. 7 illustrates the occurrence of free wires at a transition between bus states for the bus illustrated in FIG. 4.

FIG. 7 is a diagram 700 identifying occurrences of free wires 708, 710, and 712 at a transition 704 between bus states 702, 706 in an example corresponding to the bus 400 of FIG. 4. Free wires 708, 710, and 712 may be identified through an examination of past bus state 702 while encoding information for a next bus state (here, the current bus state 706). The example illustrated in FIG. 7 is based on a bus 400 where transitions occur between two signaling states and where a crosstalk-avoidance constraint is defined that prohibits transitions in opposite directions on any adjacent pair of the lanes $402_0$-$402_9$.

The past bus state 702 in the example shows the signaling state for each of the lanes $402_0$-$402_9$ as having a '0' or '1' value, which may represent different voltage levels, or direction and/or magnitude of a current flow. In the past bus state 702, two sets of lanes 722 and 724 have adjacent lanes in the same signaling state. In the first set of lanes 722, three adjacent lanes $402_1$, $402_2$ and $402_3$ are in the '1' signaling state. In the second set of lanes 724, three adjacent lanes $402_4$, $402_5$ and $402_6$ are in the '0' signaling state. In each of these sets of lanes 722 and 724, the center lane $402_2$ and $402_5$ can be set to either signaling state in the current bus state 706 without causing opposite-direction transitions within the corresponding set of lanes 722 and 724. For example, if the second lane $402_2$ and the third lane $402_2$ of the bus 400 transition when entering the current bus state 706, the transitions are in the same direction, and if only one of the lanes $402_1$, $402_2$ and $402_3$ transition when entering the current bus state 706, the third lane $402_2$ cannot be one of a pair of adjacent lanes $402_1/402_2$, or $402_2/402_3$ that causes an opposite-direction transition. In this example, the third lane $402_2$ may be identified as a free wire 708 in the current bus state 706.

One set of lanes 726 includes two adjacent lanes $402_8$, $402_9$ that are adjacent lanes in the same signaling state (the '0' signaling state) during the past bus state 702. In some instances, the tenth lane $402_9$ may be identified as a free wire in the current bus state 706 if the two adjacent lanes $402_8$, $402_9$ are physically located at the end of the bus 400 and/or next to a wire or conductor that is not expected to transition when the current bus state 706 is entered. In one example, the two adjacent lanes $402_8$, $402_9$ may be disposed next to a ground or power rail. In another example, the two adjacent lanes $402_8$, $402_9$ may be disposed next to a shielding trace, wire or connector. In another example, the two adjacent lanes $402_8$, $402_9$ may be disposed next to a trace, wire or connector that carries a signal that does not transition at the same time as the signals carried by the two adjacent lanes $402_8$, $402_9$. In this example, different rules may be employed for identifying free wires in different parts of the bus 400.

While determining the free wires 708, 710, 712 in the current bus state 706, certain pairs of the lanes $402_0$, $402_9$ may be identified as potential sources of violations of a crosstalk-avoidance constraint. In the diagram 700, four such locations 714, 716, 718, 720 are identified. Each location 714, 716, 718 and 720 involves a pair of lanes $402_0/402_1$, $402_3/402_4$, $402_6/402_7$ and $402_7/402_8$ that are in opposite signaling states in the past bus state 702 and can cause a violation of a crosstalk-avoidance constraint when entering the current bus state 706. For example, it is possible that the first lane $402_0$ may transition from signaling state '0' to signaling state '1' as the second lane $402_1$ transitions from signaling state '1' to signaling state '0.' These potential violations of crosstalk-avoidance constraints are dealt with by the CAC encoder, which may take into account the location of the free wires 708, 710, 712.

Figure 8:
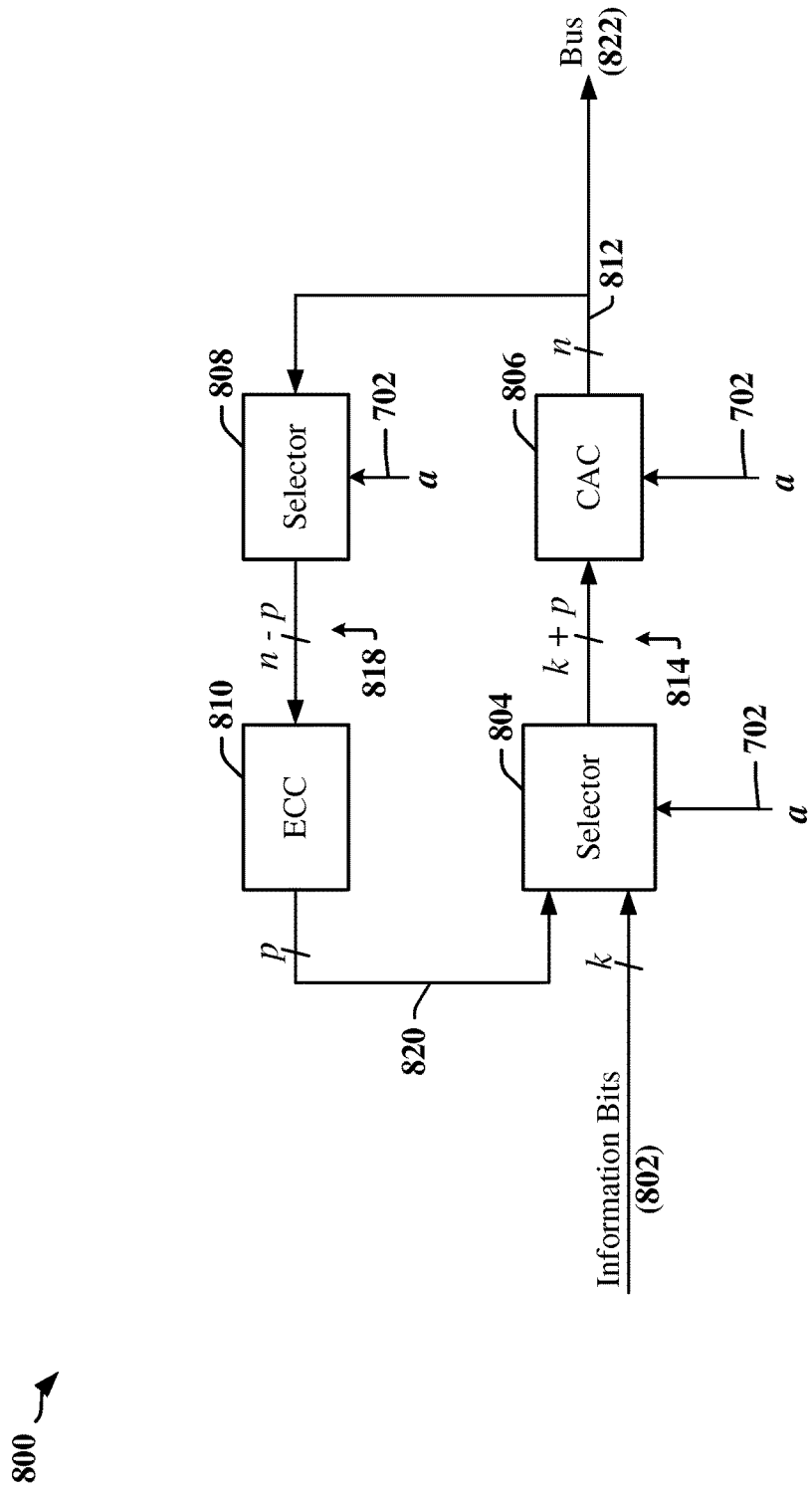
FIG. 8 illustrates a first example of an architecture for a joint CAC and Error-correction coding (ECC) encoder provided in accordance with certain aspects disclosed herein.

FIG. 8 illustrates another example of an architecture for a joint CAC/ECC encoder 800 provided in accordance with certain aspects disclosed herein. The encoder 800 may determine the positions of the free wires 708, 710, 712 using the past bus state (a) 702. Information bits 802 are passed by a first selector 804 to a CAC encoder 806. The CAC encoder 806 encodes the data for transmission on the non-free wires of the bus 822. The CAC encoder 806 may provide an output 812 in which CAC encoded bits are assigned to the non-free wires of the bus 822. The output of the CAC encoder 806 is provided to a second selector 808, which provides the encoded bits (i.e., the bits carried on the non-free wires) as an input 818 to the ECC encoder 810. The ECC encoder 810 computes ECC bits 820 from its input 818. The ECC bits 820 may be parity bits. The first selector 804 may then assign the ECC bits 820 to the free wires 708, 710, 712 of the bus 822.

In the joint CAC/ECC encoder 800, k information bits 802 are encoded for transmission over an n-lane bus 822. The bus 822 may have a sufficient number of lanes to transport p ECC bits 820 without violating crosstalk-avoidance constraints. In some instances, the number of free wires 708, 710, 712 may exceed the number of ECC bits 820. The first selector 804 and the CAC encoder 806 may use some of the free wires 708, 710, 712 to carry CAC-encoded information bits.

Figure 9:
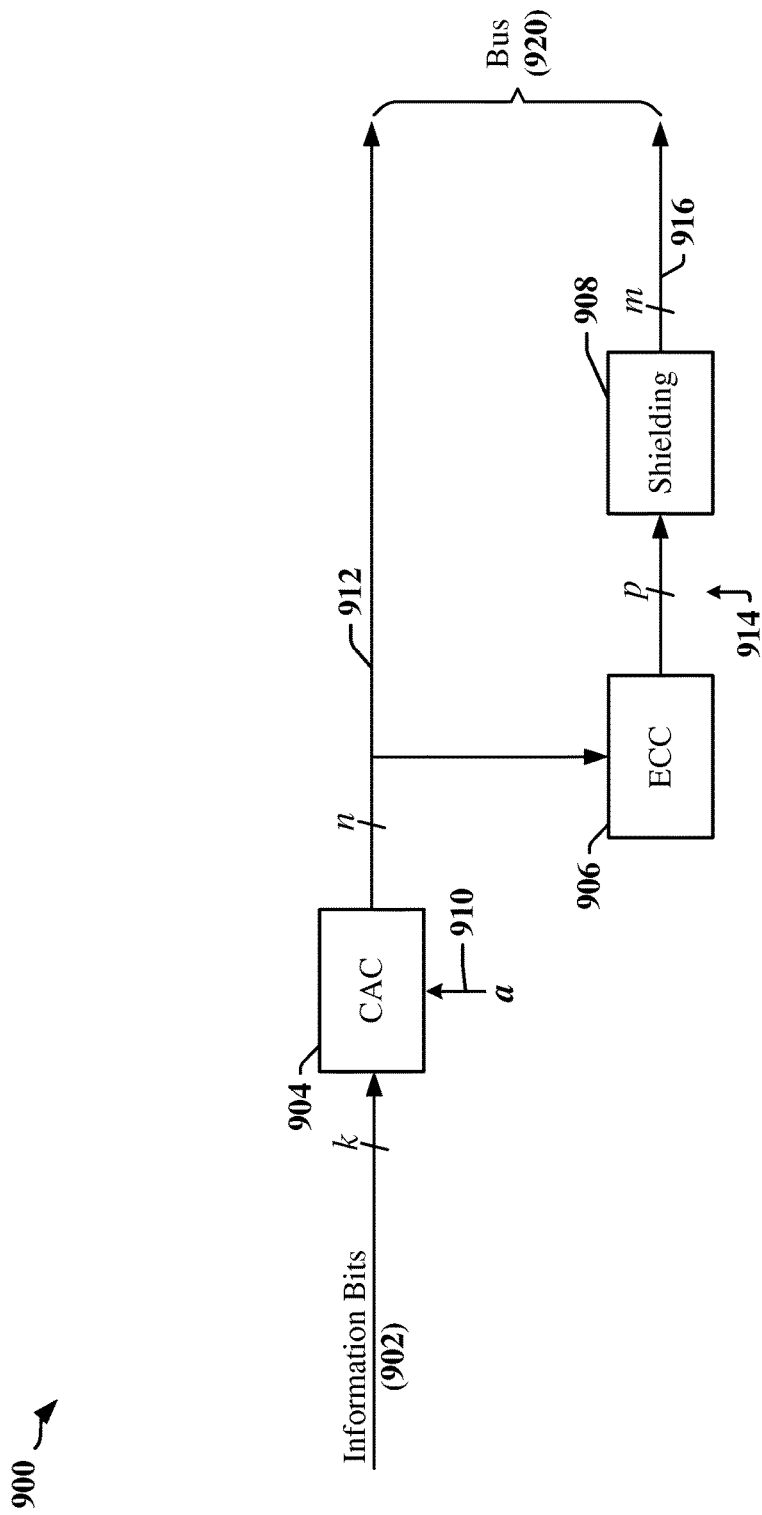
FIG. 9 illustrates a second example of an architecture for a joint CAC and ECC encoder provided in accordance with certain aspects disclosed herein.

Should the number of free wires 708, 710, 712 be less than the number of parity bits, then parity bits may be transmitted on non-free wires and may be shielded by, for example, using two wires to carry one parity bit. FIG. 9 illustrates a configuration of a joint CAC/ECC encoder 900 that may transmit shielded ECC bits. In one example, the CAC/ECC encoder 800 of FIG. 8 may be reconfigured to shield ECC bits when the number of free wires 708, 710, 712 for a current bus state 706 is less than the number of ECC bits 914 produced by the ECC encoder 906 from an encoded word 912 provided by the CAC encoder 904. The CAC encoder 904 encodes k information bits 902 to satisfy crosstalk-avoidance constraints. The CAC encoder 904 may output an n bit encoded word 912, where n corresponds to the width of the bus 920. A shielding circuit 908 may duplicate or otherwise spread the p ECC bits 914 over an m-bit word 916 that can be inserted into the n-bit encoded word 912 produced by the CAC encoder 904, where the n-bit encoded word 912 may be merged into and transmitted over m designated or assigned wires of the bus 920.

Decoding Bus State of a CAC/ECC Jointly Encoded Bus

Figure 10:
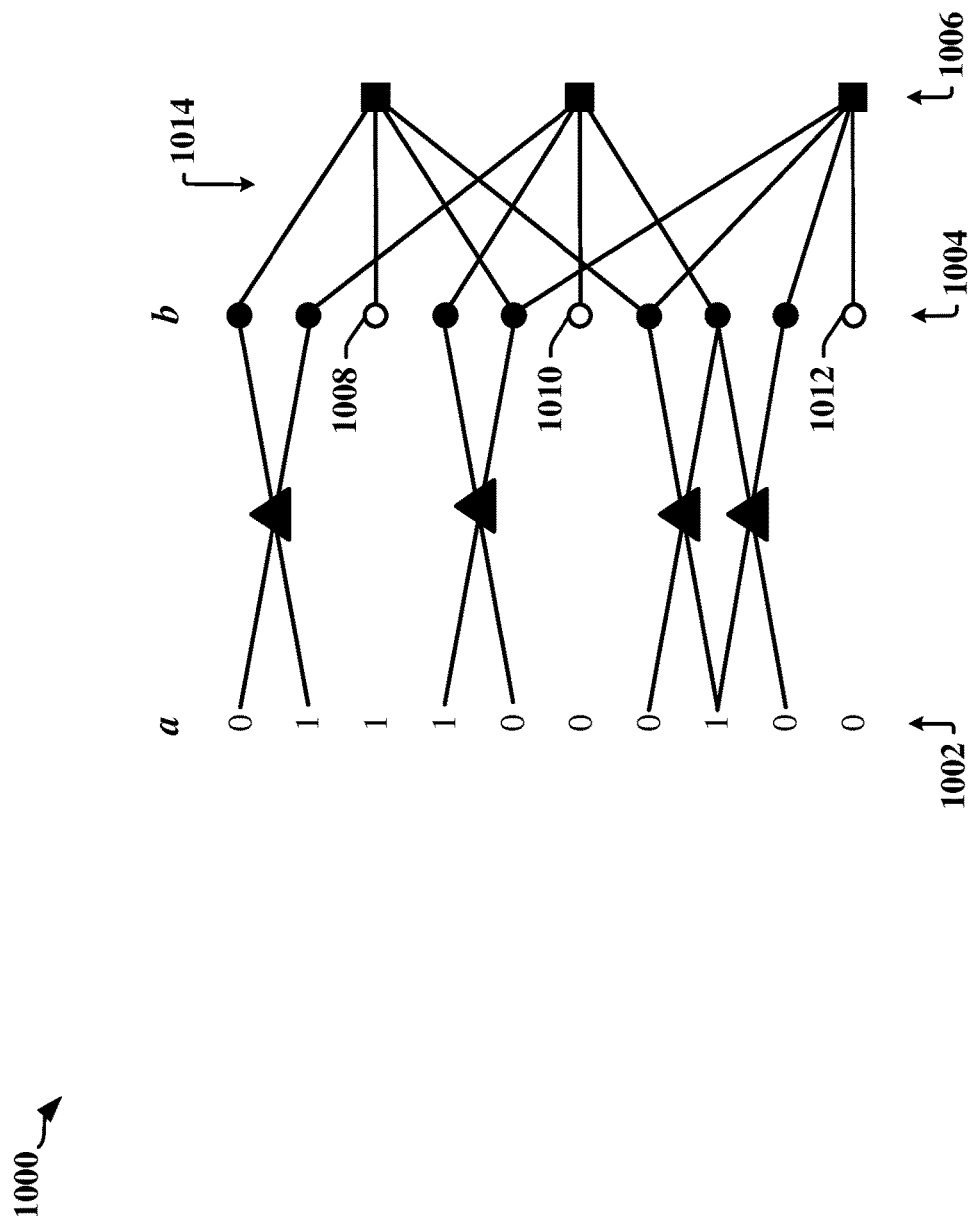
FIG. 10 is a factor graph illustrating operation of joint ECC and CAC decoding in accordance with certain aspects disclosed herein.

A receiver may be adapted to decode bus state that was encoded using joint CAC and ECC encoding in accordance with certain aspects disclosed herein. FIG. 10 is a factor graph 1000 applicable to joint ECC and CAC decoding. The operation of the receiver is described with the assumption that the past state 1002 (a) is known correctly. From the past state 1002, the receiver may determine the position and number of free wires 1008, 1010, 1012. For ease of description, an example is used in which the number of free wires 1008, 1010, 1012 is exactly equal to the number of parity bits 1006, although the principles and techniques also apply to examples in which the number of free wires 1008, 1010, 1012 is different from the number of parity bits 1006.

In one example, a receiver may include a decoder that detects the occurrence of one or more errors, and requests retransmissions when an error is detected. In another example, a receiver may include a decoder that detects the occurrence of errors, and can correct one or more errors without retransmission. The type and/or complexity of the decoder used in a receiver may be selected based on application needs, requirements and/or other specifications.

In one example, a receiver used in a latency-limited application may verify whether the data bits corresponding to the current bus state 1004 satisfy both CAC constraints and ECC checks simultaneously. In this example, the receiver computes a syndrome to check if an error has occurred. The syndrome may be computed as the output of all the parity constraints for the current bus state 1004. Concurrently, the receiver checks whether each local crosstalk constraint is satisfied for the received CAC encoded portion of the current bus state 104. An error may be detected when a local crosstalk constraint is violated. If an error is detected, the receiver may request a retransmission.

In another example, the receiver may attempt to correct transmission errors without having the data retransmitted. In this example, the receiver may employ a decoder that performs joint CAC decoding and ECC decoding to reliably recover the information bits. In some instances, a modified belief-propagation decoder may be used. A modified belief-propagation decoder may pass messages along the factor graph, including along the relationship lines 1014 between the portion of the current bus state 1004 that includes CAC encoded data and the parity bits 1006. The belief-propagation decoder can be modified to take the nonlinear CAC constraints into account. In other instances, a modified Viterbi decoder can be used to enable error detection. Joint decoding of the CAC and ECC may advantageously provide increased error protection over conventional approaches that rely of ECC encoding for error correction.

Figure 11:
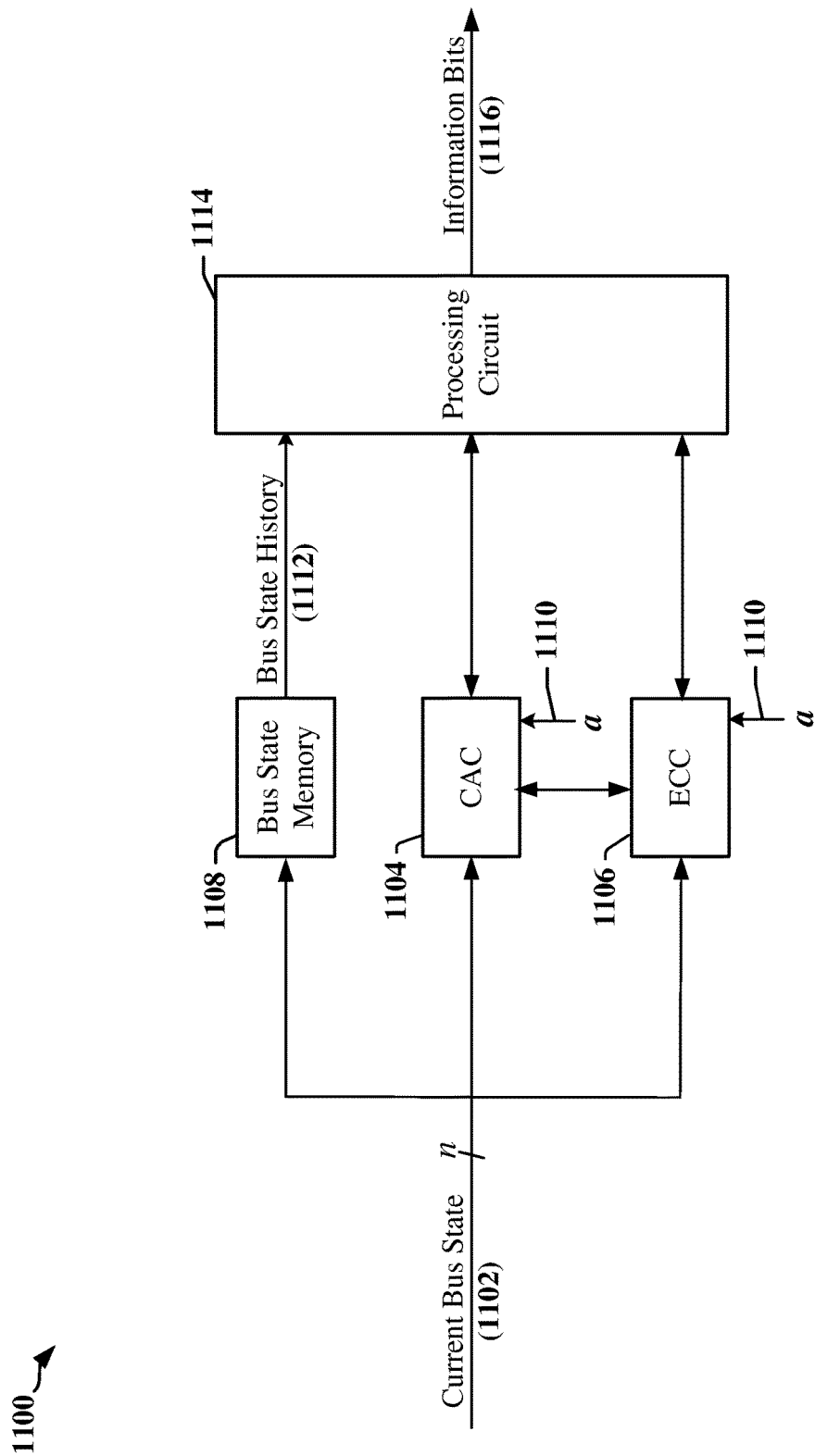
FIG. 11 illustrates an example of an architecture for a joint CAC/ECC decoder provided in accordance with certain aspects disclosed herein.

FIG. 11 illustrates an example of an architecture for a joint CAC/ECC decoder 1100 provided in accordance with certain aspects disclosed herein. One or more components or modules of the decoder 1100 may be configured to determine free wires from previously received wire state. One or more components or modules of the decoder 1100 may be configured to decode the information bits 1116 based on the knowledge of free wires.

The decoder 1100 may include a CAC decoder 1104, an ECC decoder 1106 and a bus state memory 1108. The bus state memory 1108 may include one or more registers. The bus state memory 1108 may be implemented in a memory device and/or any suitable storage medium. The bus state memory 1108 may maintain a history 1112 of prior bus states and may provide access or copies of the last decoded bus state as a bus state history 1112 that may be provided to a processing circuit 1114. In one example, the bus state memory 1108 provides a control signal 1110 to indicate the last-decoded bus state to the CAC decoder 1104 and ECC decoder 1106. The control signal 1110 may include a copy of the last-decoded bus state, and may include other information related to the operation of the CAC decoder 1104 and the ECC decoder 1106. For example, the control signal 1110 may indicate one or more free wires. The CAC decoder 1104 and the ECC decoder 1106 may determine the positions of the free wires 708, 710, 712 using the last-decoded bus state indicated in the control signal 1110.

The CAC decoder 1104 and the ECC decoder 1106 may receive the current bus state 1102 from line receivers or other interface circuits. The CAC decoder 1104 and the ECC decoder 1106 may be configured to jointly decode the current bus state and to detect errors. In some examples, the CAC decoder 1104 and the ECC decoder 1106 may be configured to correct certain types of error when errors are detected. A processing circuit 1114 or other controller may determine a mode of operation for the decoder 1100 and may select error detection and/or correction configurations. In one example, the processing circuit 1114 may perform or control certain functions associated with a modified Viterbi decoder or a belief propagation decoder adapted in accordance with certain aspects disclosed herein. In another example, the CAC decoder 1104 may receive information from the ECC decoder 1106 that enables the CAC decoder 1104 to decode an error-corrected version of the current bus state 1102.

Additional Descriptions of Certain Aspects

Figure 12:
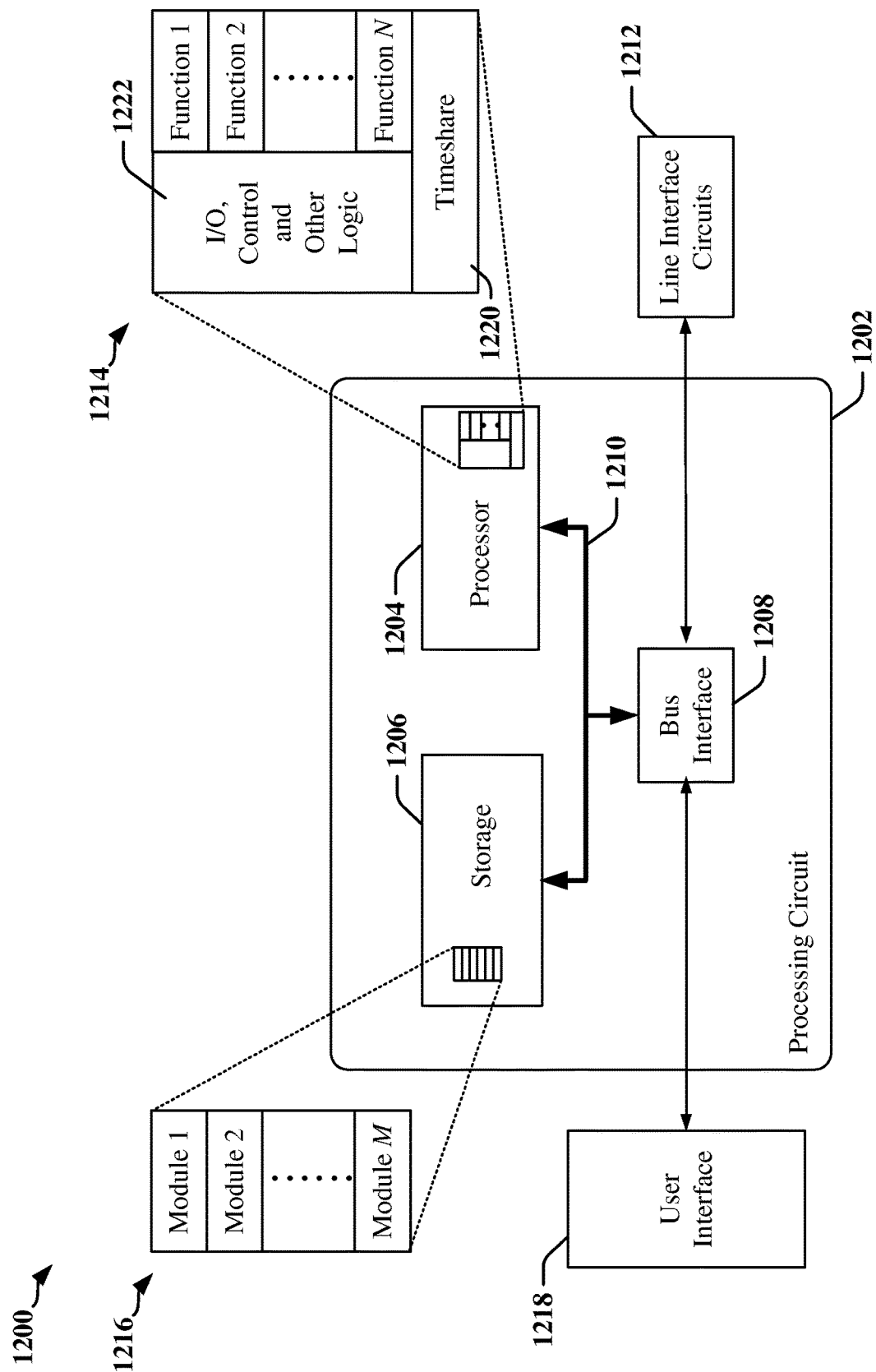
FIG. 12 illustrates an example of an apparatus employing a processing system that may be adapted according to certain aspects disclosed herein.

FIG. 12 is a conceptual diagram illustrating a simplified example of a hardware implementation for an apparatus 1200 employing a processing circuit 1202 that may be configured to perform one or more functions disclosed herein. For example, the apparatus 1200 may be configured to support operations related to joint CAC and ECC encoding according to one or more aspects of the disclosure, including aspects related to the method illustrated in FIG. 13. In accordance with various aspects of the disclosure, an element, or any portion of an element, or any combination of elements as disclosed herein may be implemented using the processing circuit 1202. The processing circuit 1202 may include one or more processors 1204 that are controlled by some combination of hardware and software modules. Examples of processors 1204 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more line interface circuits 1212. A line interface circuit 1212 may be provided for each networking technology supported by the processing circuit. In some instances, multiple networking technologies may share some or all of the circuitry or processing modules found in a line interface circuit 1212. Each line interface circuit 1212 provides a means for communicating with various other apparatus over a transmission medium. Depending upon the nature of the apparatus, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as the line interface circuit 1212, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to the line interface circuit 1212, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the line interface circuit 1212, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Figure 13:
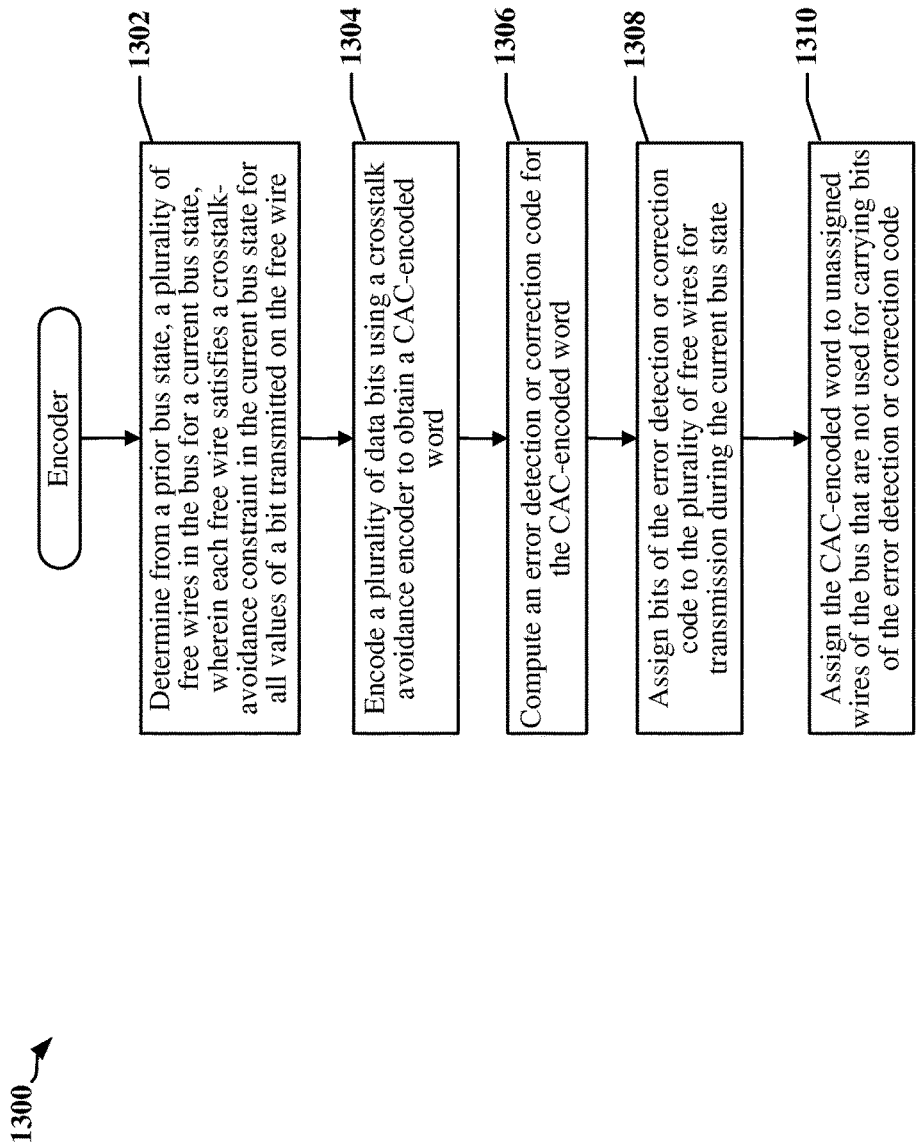
FIG. 13 is a flow chart of a method for transmitting data bits over a multi-wire parallel bus in accordance with certain aspects disclosed herein.

FIG. 13 is a flow chart 1300 of a method operational a device coupled to a multi-wire parallel bus.

At block 1302, the device may determine from a prior bus state, a plurality of free wires in the bus for a current bus state. Each free wire may satisfy a crosstalk-avoidance constraint in the current bus state for all values of a bit transmitted on the free wire. A free wire may satisfy a crosstalk-avoidance constraint in the current bus state when it is in the same signaling state as each directly adjacent wire in the prior bus state.

At block 1304, the device may encode a plurality of data bits using a crosstalk avoidance encoder to obtain a CAC-encoded word. The crosstalk avoidance encoder may be configured to avoid producing opposite direction transitions on pairs of neighboring wires.

At block 1306, the device may compute an error detection or correction code for the CAC-encoded word.

At block 1308, the device may assign bits of the error detection or correction code to the plurality of free wires for transmission during the current bus state.

At block 1302, the device may assign the CAC-encoded word to wires that are not used for carrying bits of the error detection or correction code. At least a portion of the CAC-encoded word may be assigned to wires that are not free wires. In some instances, one or more bits of the CAC-encoded word may be assigned to wires that are free wires during the current bus state.

In one example, computing an error detection or correction code includes generating a block error-correction code from the CAC-encoded word. In another example, computing an error detection or correction code may include generating a cyclic-redundancy code from the CAC-encoded word. In some instances, the cyclic-redundancy code may have 8 bits. In another example, computing an error detection or correction code includes generating the error detection or correction code using a convolutional encoder. In some instances, the plurality of data bits is sequentially encoded. Assigning bits of the error detection or correction code may include queuing bits of the error detection or correction code received from the convolutional encoder in a queue, assigning a bit obtained from the queue to a free wire encountered in a sequence of wires when a bit of the error detection or correction code is available in the queue, and assigning a bit of the CAC-encoded word to the free wire when no bits of the error detection or correction code are available in the queue. In one example, the sequence of wires may include wires of the bus ordered such that each wire in the sequence is physically adjacent to predecessor and successor wires in the sequence of wires.

In some instances, assigning bits of the error detection or correction code may include queuing bits of the error detection or correction code received from the convolutional encoder in a queue, and using a pair of adjacent wires in the sequence of wires to carry one parity bit when the queue is full.

Figure 14:
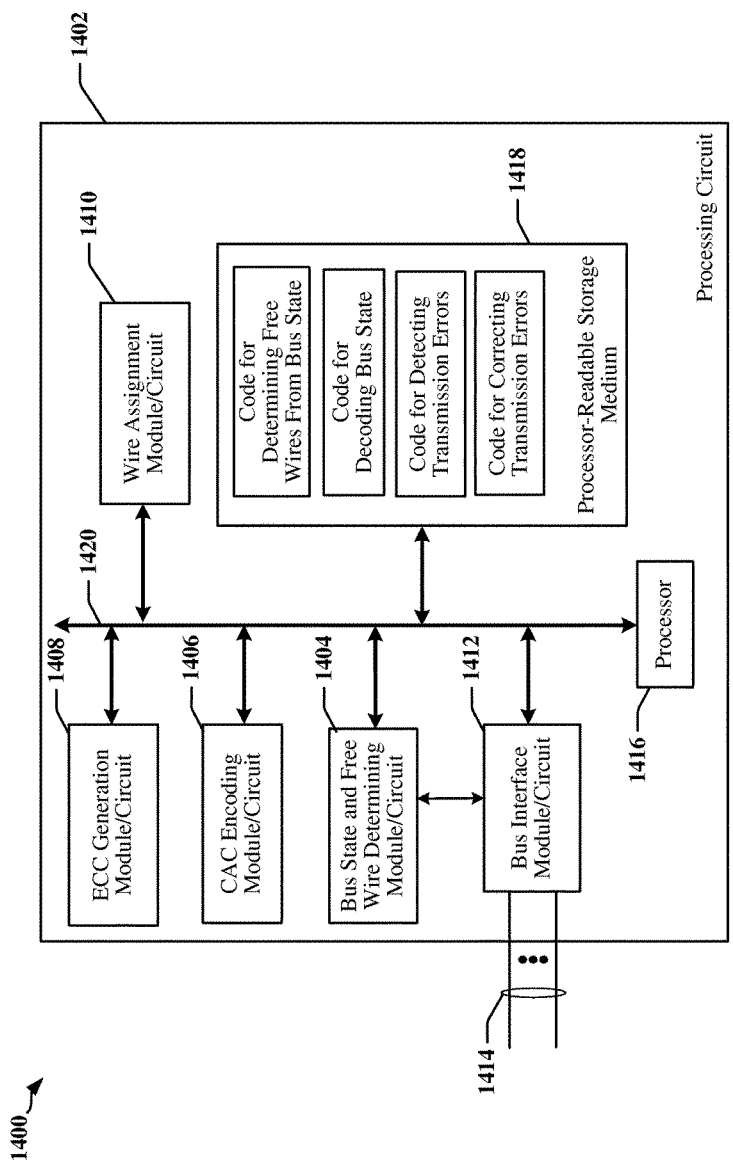
FIG. 14 illustrates a second example of a hardware implementation for an apparatus used in a device that transmits data bits over a multi-wire parallel bus according to certain aspects disclosed herein.

FIG. 14 is a diagram illustrating a simplified example of a hardware implementation for an apparatus 1400 employing a processing circuit 1402. The processing circuit typically has a processor 1416 that may include one or more of a microprocessor, microcontroller, digital signal processor, a sequencer and a state machine. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the processor 1416, the modules or circuits 1404, 1406, 1408, and 1408, a bus interface 1412 configurable to communicate over connectors or wires of a multi-wire communication link 1414 and the computer-readable storage medium 1418. The bus 1420 may also link various other circuits such as timing sources, peripherals, voltage regulators, and power management circuits.

The processor 1416 is responsible for general processing, including the execution of software stored on the computer-readable storage medium 1418. The software, when executed by the processor 1416, causes the processing circuit 1402 to perform the various functions described supra for any particular apparatus. The computer-readable storage medium 1418 may also be used for storing data that is manipulated by the processor 1416 when executing software, including data decoded from symbols transmitted over the multi-wire communication link 1414, which may be configured as data lanes and clock lanes. The processing circuit 1402 further includes at least one of the modules 1404, 1406, 1408, and 1408. The modules 1404, 1406, 1408, and 1408 may be software modules running in the processor 1416, resident/stored in the computer-readable storage medium 1418, one or more hardware modules coupled to the processor 1416, or some combination thereof. The 1404, 1406, 1408, and/or 1408 may include microcontroller instructions, state machine configuration parameters, or some combination thereof.

In one configuration, the apparatus 1400 for data communication includes modules and/or circuits 1404, 1412 configured to determine free wires of the multi-wire communication link 1414 for a past bus state. The apparatus 1400 may include modules and/or circuits 1406 configured to encode information bits in a CAC-encoded word and modules and/or circuits 1408 configured to calculate an ECC for the CAC-encoded word. The apparatus 1400 may include modules and/or circuits 1410 configured to assign ECC bits to free wires and bits of the CAC-encoded word to non-free wires.

Figure 15:
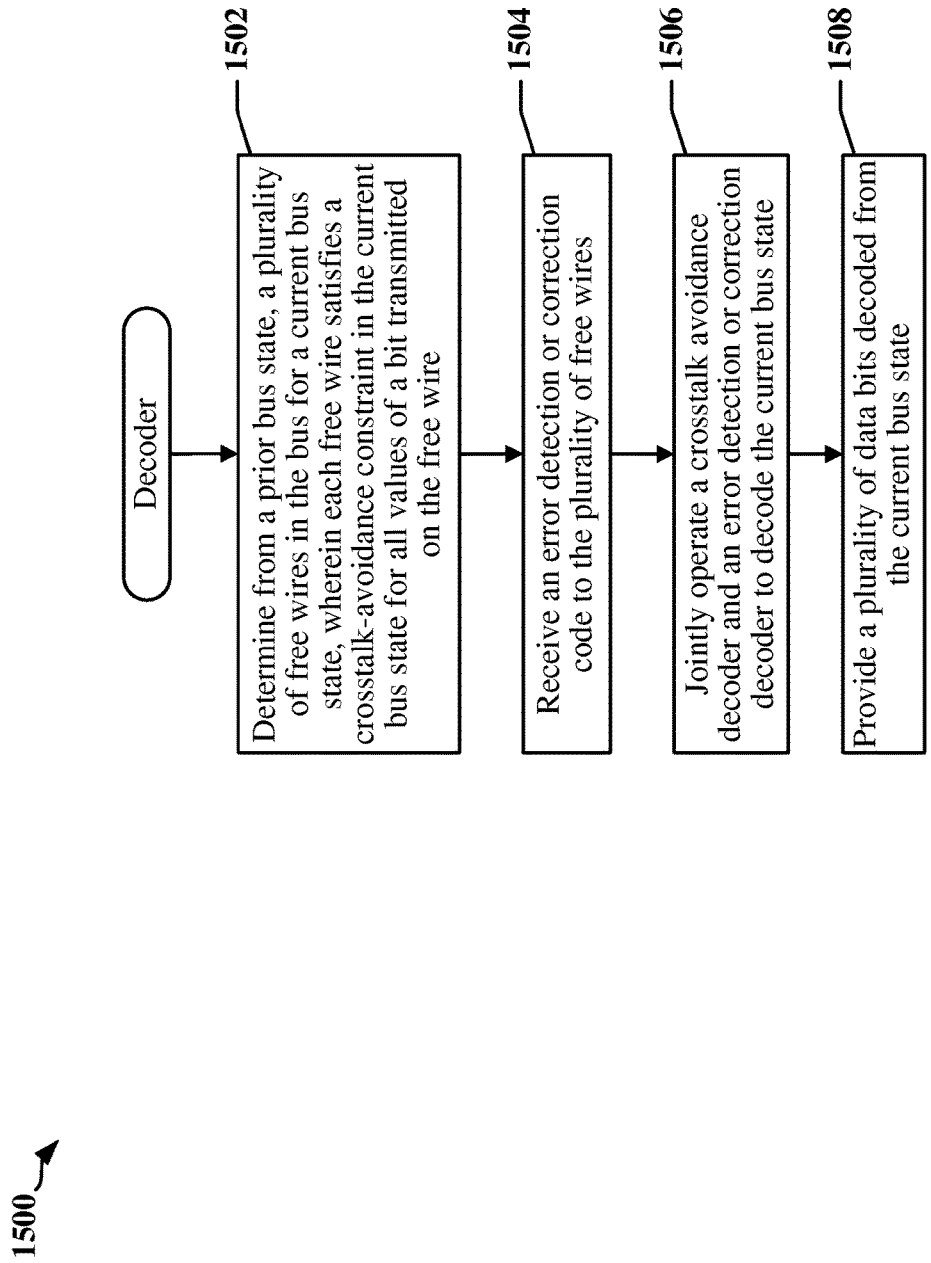
FIG. 15 is a flow chart of a method for decoding data bits from a multi-wire parallel bus in accordance with certain aspects disclosed herein.

FIG. 15 is a flow chart 1500 of a method operational a receiving device coupled to a multi-wire parallel bus.

At block 1502, the device may determine from a prior bus state, a plurality of free wires in the bus for a current bus state. Each free wire may satisfy a crosstalk-avoidance constraint in the current bus state for all values of a bit transmitted on the free wire.

At block 1504, the device may receive an error detection or correction code from the plurality of free wires.

At block 1506, the device may jointly operate a crosstalk avoidance decoder and an error detection or correction decoder to decode the current bus state.

At block 1508, the device may provide a plurality of data bits decoded from the current bus state.

In some examples, the error detection or correction decoder is configured to detect the occurrence of one or more errors. In some instances, the device may request retransmission of data encoded in the current bus state when an error is detected. In other instances, the device may correct one or more errors in the current bus state when an error is detected.

In some examples, the device may operate the crosstalk avoidance decoder and the error detection or correction decoder jointly by concurrently verifying whether data bits corresponding to the current bus state satisfy crosstalk-avoidance constraints, and checking the error detection or correction code to determine whether a transmission error affecting the current bus state has occurred. In other examples, the device may operate the crosstalk avoidance decoder and the error detection or correction decoder jointly by verifying whether data bits corresponding to the current bus state satisfy crosstalk-avoidance constraints, and correcting a transmission error using the error detection or correction code.

In some examples, the device may use a modified belief-propagation decoder to ensure reliability of the plurality of data bits decoded from the current bus state. In other examples, the device may use a Viterbi decoder to ensure reliability of the plurality of data bits decoded from the current bus state.

Figure 16:
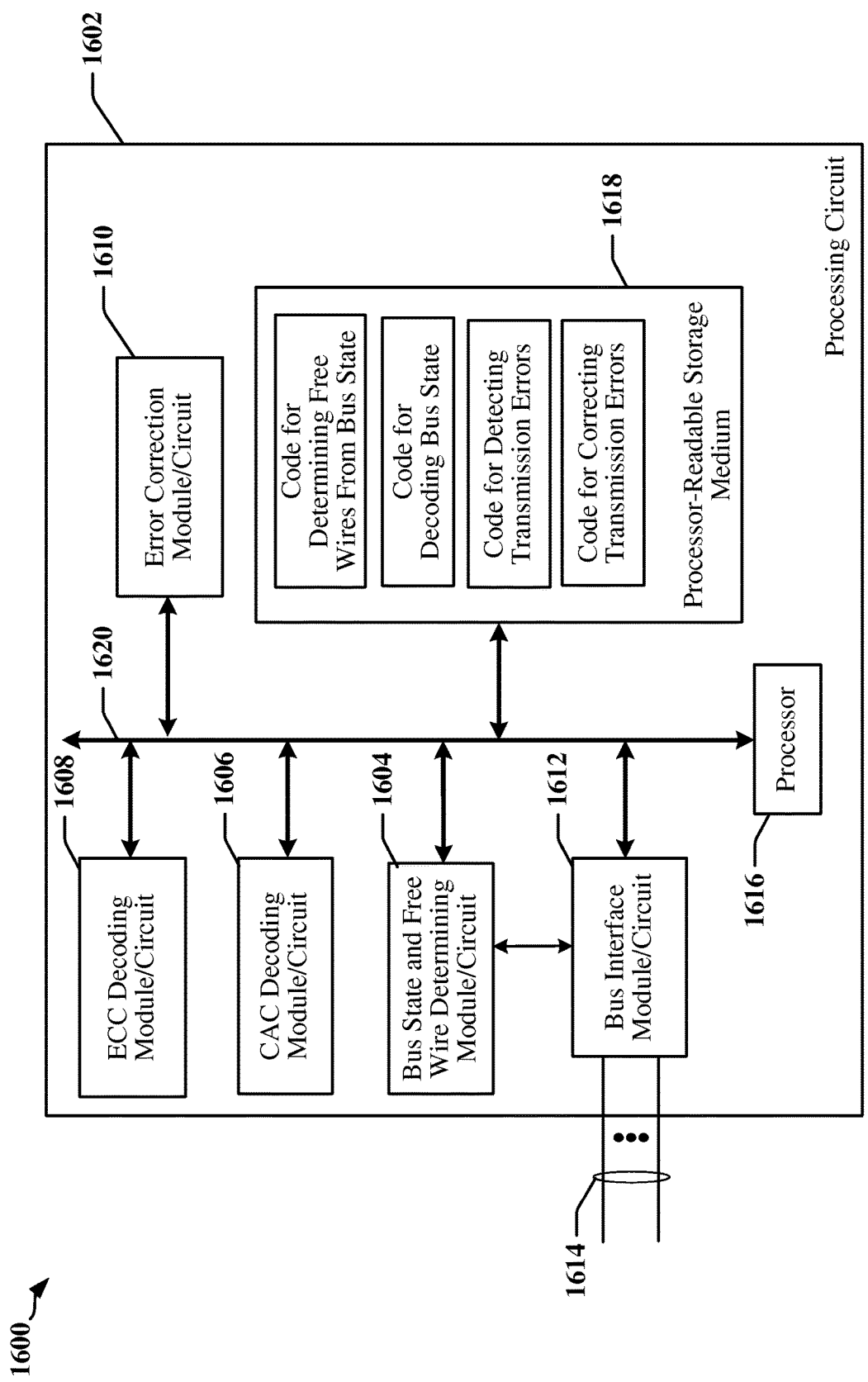
FIG. 16 illustrates a second example of a hardware implementation for an apparatus used in a device that decodes data bits from a multi-wire parallel bus according to certain aspects disclosed herein.

FIG. 16 is a diagram illustrating a simplified example of a hardware implementation for an apparatus 1600 employing a processing circuit 1602. The processing circuit typically has a processor 1616 that may include one or more of a microprocessor, microcontroller, digital signal processor, a sequencer and a state machine. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the processor 1616, the modules or circuits 1604, 1606, 1608, and 1608, a bus interface 1612 configurable to communicate over connectors or wires of a multi-wire communication link 1614 and the computer-readable storage medium 1618. The bus 1620 may also link various other circuits such as timing sources, peripherals, voltage regulators, and power management circuits.

The processor 1616 is responsible for general processing, including the execution of software stored on the computer-readable storage medium 1618. The software, when executed by the processor 1616, causes the processing circuit 1602 to perform the various functions described supra for any particular apparatus. The computer-readable storage medium 1618 may also be used for storing data that is manipulated by the processor 1616 when executing software, including data decoded from symbols transmitted over the multi-wire communication link 1614, which may be configured as data lanes and clock lanes. The processing circuit 1602 further includes at least one of the modules 1604, 1606, 1608, and 1608. The modules 1604, 1606, 1608, and 1608 may be software modules running in the processor 1616, resident/stored in the computer-readable storage medium 1618, one or more hardware modules coupled to the processor 1616, or some combination thereof. The 1604, 1606, 1608, and/or 1608 may include microcontroller instructions, state machine configuration parameters, or some combination thereof.

In one configuration, the apparatus 1600 for data communication includes modules and/or circuits 1604, 1612 configured to determine from a prior bus state, a plurality of free wires in the bus 1620 for a current bus state, modules and/or circuits 1608, 1612 configured to receive an error detection or correction code from the plurality of free wires, and modules and/or circuits 1606, 1612 configured to decode the current bus state. The apparatus 1600 may jointly operate a crosstalk avoidance decoder and an error detection or correction decoder to provide a plurality of data bits decoded from the current bus state.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents of the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of transmitting data bits over a multi-wire parallel bus, comprising:
   determining from a prior bus state, a plurality of free wires in the bus for a current bus state, wherein each free wire satisfies a crosstalk-avoidance constraint in the current bus state for all values of a bit transmitted on the free wire;
   encoding a plurality of data bits using a crosstalk avoidance encoder to obtain a crosstalk avoidance encoded word;
   computing an error detection or correction code for the crosstalk avoidance encoded word;
   assigning bits of the error detection or correction code to the plurality of free wires for transmission during the current bus state; and
   assigning the crosstalk avoidance encoded word to wires of the bus that are not used for carrying bits of the error detection or correction code.

2. The method of claim 1, wherein a free wire satisfies a crosstalk-avoidance constraint in the current bus state when the free wire and each directly adjacent wire are in a same signaling state in the prior bus state.

3. The method of claim 1, wherein the crosstalk avoidance encoder is configured to avoid producing opposite direction transitions on pairs of neighboring wires.

4. The method of claim 1, wherein computing an error detection or correction code comprises:
   generating a block error-correction code from the crosstalk avoidance encoded word.

5. The method of claim 1, wherein computing an error detection or correction code comprises:
   generating a cyclic-redundancy code from the crosstalk avoidance encoded word.

6. The method of claim 1, wherein computing an error detection or correction code comprises:
   generating the error detection or correction code using a convolutional encoder.

7. The method of claim 6, wherein:
   encoding the plurality of data bits comprises sequentially encoding the plurality of data bits; and
   assigning bits of the error detection or correction code comprises:
      queuing bits of the error detection or correction code received from the convolutional encoder in a queue;
      assigning a bit obtained from the queue to a free wire encountered in a sequence of wires when a bit of the error detection or correction code is available in the queue; and
      assigning a bit of the crosstalk avoidance encoded word to the free wire when no bits of the error detection or correction code are available in the queue.

8. The method of claim 6, wherein:
   encoding the plurality of data bits comprises sequentially encoding the plurality of data bits; and
   assigning bits of the error detection or correction code comprises:
      queuing bits of the error detection or correction code received from the convolutional encoder in a queue; and
      assigning a bit obtained from the queue to a pair of adjacent wires in a sequence of wires when the queue is full.

9. An apparatus, comprising:
   a storage device configured to maintain an indication of a past state of a multi-wire parallel bus;
   a crosstalk avoidance encoder adapted to:
      determine a plurality of free wires in the bus for a current state of the multi-wire parallel bus based on the past state of the multi-wire parallel bus, wherein each free wire satisfies a crosstalk-avoidance constraint in the current state of the multi-wire parallel bus for all values of a bit transmitted on the free wire; and
      provide a crosstalk avoidance encoded word by encoding a plurality of data bits;
   an error-correction coding (ECC) encoder configured to compute an error detection or correction code for the crosstalk avoidance encoded word; and a selector circuit configured to:
  assign bits of the error detection or correction code to the plurality of free wires for transmission as part of the current state of the multi-wire parallel bus; and
  assign the crosstalk avoidance encoded word to wires of the bus that are not used for carrying bits of the error detection or correction code.

10. The apparatus of claim 9, wherein a free wire satisfies a crosstalk-avoidance constraint in the current state of the multi-wire parallel bus when the free wire and each directly adjacent wire are in a same signaling state in the past state of the multi-wire parallel bus, and wherein the crosstalk avoidance encoder is configured to avoid producing opposite direction transitions on pairs of neighboring wires.

11. The apparatus of claim 9, wherein the ECC encoder is configured to:
  generate a block error-correction code from the crosstalk avoidance encoded word.

12. The apparatus of claim 9, wherein the ECC encoder is configured to:
  generate a cyclic-redundancy code from the crosstalk avoidance encoded word.

13. The apparatus of claim 9, further comprising:
  a queue that is configured to queue ECC bits received from the ECC encoder, wherein the ECC encoder comprises a convolutional encoder, and wherein the crosstalk avoidance encoder is configured to encode the plurality of data bits sequentially.

14. The apparatus of claim 13, wherein the selector circuit is configured to:
  assign a bit obtained from the queue to a free wire encountered in a sequence of wires when a bit of the error detection or correction code is available in the queue; and
  assign a bit of the crosstalk avoidance encoded word to the free wire when no bits of the error detection or correction code are available in the queue.

15. The apparatus of claim 13, wherein the selector circuit is configured to:
  assign a bit obtained from the queue to a pair of adjacent wires in a sequence of wires when the queue is full.

16. A method of receiving data bits from a multi-wire parallel bus, comprising:
  determining from a prior bus state, a plurality of free wires in the bus for a current bus state, wherein each free wire satisfies a crosstalk-avoidance constraint in the current bus state for all values of a bit transmitted on the free wire;
  receiving an error detection or correction code from the plurality of free wires;
  jointly operating a crosstalk avoidance decoder and an error detection or correction decoder to decode the current bus state; and
  providing a plurality of data bits decoded from the current bus state.

17. The method of claim 16, wherein the error detection or correction decoder is configured to detect an occurrence of one or more errors.

18. The method of claim 17, further comprising:
  requesting retransmission of data encoded in the current bus state when an error is detected.

19. The method of claim 17, further comprising:
  correcting one or more errors in the current bus state when an error is detected.

20. The method of claim 16, wherein jointly operating the crosstalk avoidance decoder and the error detection or correction decoder comprises concurrently:
  verifying whether data bits corresponding to the current bus state satisfy crosstalk-avoidance constraints; and
  checking the error detection or correction code to determine whether a transmission error affecting the current bus state has occurred.

21. The method of claim 16, wherein jointly operating the crosstalk avoidance decoder and the error detection or correction decoder comprises concurrently:
  verifying whether data bits corresponding to the current bus state satisfy crosstalk-avoidance constraints; and
  correcting a transmission error using the error detection or correction code.

22. The method of claim 16, wherein jointly operating the crosstalk avoidance decoder and the error detection or correction decoder comprises:
  using a modified belief-propagation decoder to ensure reliability of the plurality of data bits decoded from the current bus state.

23. The method of claim 16, wherein jointly operating the crosstalk avoidance decoder and the error detection or correction decoder comprises:
  using a Viterbi decoder to ensure reliability of the plurality of data bits decoded from the current bus state.

24. An apparatus comprising:
  means for determining from a prior bus state, a plurality of free wires in the bus for a current bus state, wherein each free wire satisfies a crosstalk-avoidance constraint in the current bus state for all values of a bit transmitted on the free wire;
  means for receiving an error detection or correction code from the plurality of free wires; and
  means for decoding a plurality of data bits from the current bus state, including a crosstalk avoidance decoder and an error detection or correction decoder,
  wherein the crosstalk avoidance decoder and the error detection or correction decoder are jointly operated.

25. The apparatus of claim 24, wherein the error detection or correction decoder is configured to detect an occurrence of one or more errors.

26. The apparatus of claim 24, wherein the error detection or correction decoder is configured to correct one or more errors in the current bus state when an error is detected.

27. The apparatus of claim 24, wherein the means for decoding the plurality of data bits is configured to concurrently:
  verify whether data bits corresponding to the current bus state satisfy crosstalk-avoidance constraints; and
  check the error detection or correction code to determine whether a transmission error affecting the current bus state has occurred.

28. The apparatus of claim 24, wherein the means for decoding the plurality of data bits is configured to:
  verify whether data bits corresponding to the current bus state satisfy crosstalk-avoidance constraints; and
  correct a transmission error using the error detection or correction code.

29. The apparatus of claim 24, wherein the means for decoding the plurality of data bits is configured to use a modified belief-propagation decoder to ensure reliability of the plurality of data bits decoded from the current bus state.

30. The apparatus of claim 24, wherein the means for decoding the plurality of data bits is configured to use a Viterbi decoder to ensure reliability of the plurality of data bits decoded from the current bus state.

* * * * *